United States Patent
Watanabe et al.

(10) Patent No.: US 12,436,329 B2
(45) Date of Patent: Oct. 7, 2025

(54) OPTICAL DEVICE

(71) Applicant: HAMAMATSU PHOTONICS K.K., Hamamatsu (JP)

(72) Inventors: Tsubasa Watanabe, Hamamatsu (JP); Hiroto Sakai, Hamamatsu (JP); Yasushi Ohbayashi, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 465 days.

(21) Appl. No.: 18/015,346

(22) PCT Filed: Jun. 16, 2021

(86) PCT No.: PCT/JP2021/022915
§ 371 (c)(1),
(2) Date: Jan. 10, 2023

(87) PCT Pub. No.: WO2022/019010
PCT Pub. Date: Jan. 27, 2022

(65) Prior Publication Data
US 2023/0280515 A1    Sep. 7, 2023

(30) Foreign Application Priority Data
Jul. 21, 2020    (JP) .................. 2020-124457

(51) Int. Cl.
*G02B 5/28*    (2006.01)
*G02B 1/11*    (2015.01)
*G02B 21/00*    (2006.01)

(52) U.S. Cl.
CPC ............. *G02B 5/285* (2013.01); *G02B 1/11* (2013.01); *G02B 21/0092* (2013.01)

(58) Field of Classification Search
CPC ......... G02B 5/288; G02B 5/287; G02B 5/285
See application file for complete search history.

(56) References Cited

U.S. PATENT DOCUMENTS

2009/0294634 A1* 12/2009 Kurahashi .............. G03B 11/00
250/226
2016/0025994 A1*  1/2016 Shagam ............... B23K 26/384
356/440

FOREIGN PATENT DOCUMENTS

JP    2001-284561 A    10/2001
JP    2017-097280 A     6/2017

OTHER PUBLICATIONS

Fukano, Takashi, "Where is the position of a galvo mirror?—Microscope field stop and aperture stop," OSJ Publications, vol. 37, No. 5, 2008, pp. 303-305.
International Preliminary Report on Patentability mailed Feb. 2, 2023 for PCT/JP2021/022915.

* cited by examiner

*Primary Examiner* — Alexander P Gross
(74) *Attorney, Agent, or Firm* — Faegre Drinker Biddle & Reath LLP

(57) ABSTRACT

An optical apparatus includes an angle filter disposed on an optical path in the middle of focusing or in the middle of divergence by a focusing optical element. The angle filter includes a dielectric multilayer film in which dielectric layers having a first refractive index and dielectric layers having a second refractive index lower than the first refractive index are alternately stacked.

7 Claims, 26 Drawing Sheets

(a)

(b)

(a)

(b)

(a)

(b)

(a)

(b)

(a)

(b)

(a)

(b)

OPTICAL DEVICE

TECHNICAL FIELD

The present disclosure relates to an optical apparatus.

BACKGROUND ART

Patent Document 1 discloses a technique related to an optical filter. The optical filter includes a dielectric multilayer film in which low refractive index layers and high refractive index layers are alternately stacked, and is intended to transmit incident light when an incident angle is within a predetermined angle.

CITATION LIST

Patent Literature

Patent Document 1: Japanese Patent Application Laid-Open Publication No. 2017-97280

SUMMARY OF INVENTION

Technical Problem

As a spatial frequency filter for extracting or removing a desired frequency component from light propagating through space, there is known a filter including a focusing optical system such as a lens and a spatial filter. In this spatial frequency filter, the spatial filter having various aperture shapes is disposed on a Fourier plane including a rear focal point of the focusing optical system, and a part of light being Fourier transformed by the focusing optical system is passed through the filter to extract a desired frequency component and remove unnecessary frequency components.

In the above configuration, it is necessary to perform optical axis adjustment of the focusing optical system and the spatial filter with extremely high accuracy (for example, the same degree as a focusing spot size of light). This is because even a slight deviation between an optical axis of the focusing optical system and an optical axis of the spatial filter causes a frequency component to be extracted or removed to deviate from a desired frequency. However, a mechanically precisely adjusted relative position between the focusing optical system and the spatial filter is susceptible to external factors such as vibration and temperature. Therefore, a frequency property may vary due to the external factors.

An object of an embodiment is to provide an optical apparatus capable of suppressing a change in frequency property caused by a change in relative position between a focusing optical system and a filter.

Solution to Problem

An embodiment is an optical apparatus. The optical apparatus includes an angle filter disposed on an optical path in the middle of focusing or divergence by a focusing optical element, and the angle filter includes a dielectric multilayer film in which dielectric layers having a first refractive index and dielectric layers having a second refractive index lower than the first refractive index are alternately stacked.

In the above configuration, a transmittance and a reflectance of the dielectric multilayer film change according to an incident angle of light, and the property thereof can be controlled by a layer structure (thickness of each layer, number of stacked layers, and material) of the dielectric multilayer film. Further, when the dielectric multilayer film is disposed on the optical path in the middle of focusing or in the middle of divergence, the incident angle of light changes according to a distance from a center of the optical path.

Specifically, the incident angle becomes smaller as it is closer to the center of the optical path, and the incident angle becomes larger as it is farther from the center of the optical path. Therefore, according to the above optical apparatus, a desired frequency component can be selectively transmitted or reflected in a frequency space after passing through the focusing optical element, and a spatial frequency filter can be suitably realized.

Further, a change in relative positional relationship between the focusing optical system and the dielectric multilayer film has little effect on the above filter function. Therefore, according to the above optical apparatus, compared to the configuration in which the spatial filter having the aperture is disposed on the Fourier plane including the rear focal point of the focusing optical system, it is possible to significantly suppress a change in frequency property caused by a change in relative position between the focusing optical system and the filter.

Advantageous Effects of Invention

According to the embodiment, it is possible to provide an optical apparatus capable of suppressing a change in frequency property being caused by a change in relative position between a focusing optical system and a filter.

DESCRIPTION OF EMBODIMENTS

Hereinafter, embodiments of an optical apparatus will be described in detail with reference to the accompanying drawings. In the description of the drawings, the same elements will be denoted by the same reference signs, and redundant description will be omitted. The present invention is not limited to these examples.

Figure 1:
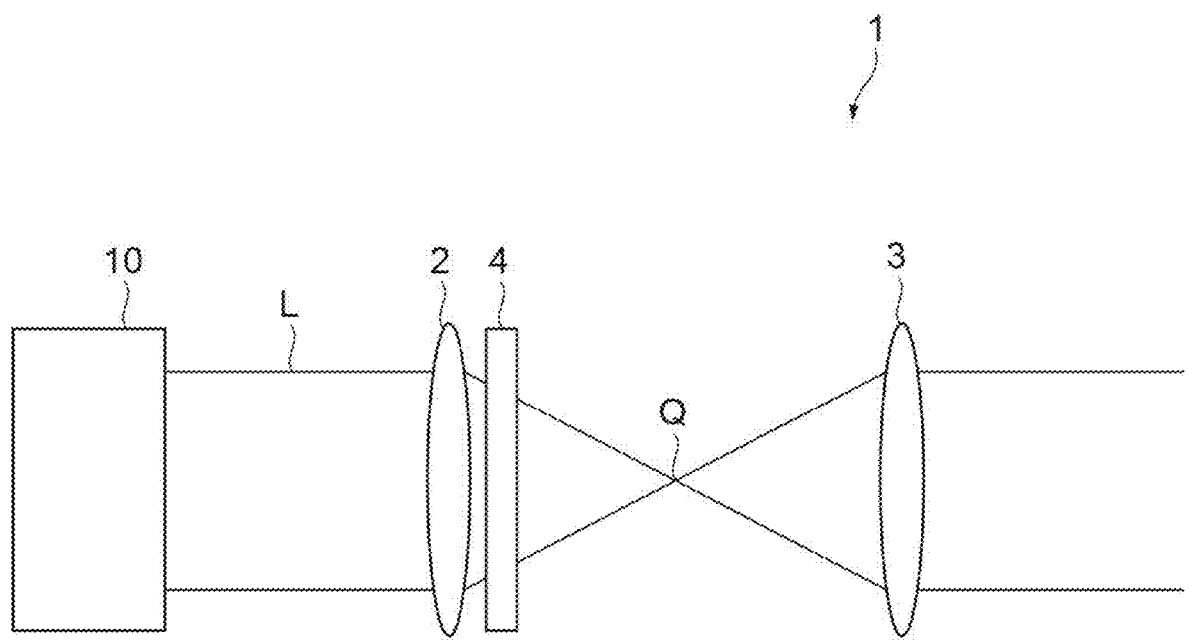
FIG. 1 is a diagram schematically illustrating a configuration of an optical apparatus according to an embodiment.

FIG. 1 is a diagram schematically illustrating a configuration of an optical apparatus 1 according to an embodiment. The optical apparatus 1 includes focusing optical elements 2 and 3, and an angle filter 4.

Each of the focusing optical elements 2 and 3 is, for example, a convex lens. The focusing optical element 3 is disposed at a subsequent stage of the focusing optical element 2, and constitutes a 4f optical system together with the focusing optical element 2. That is, the optical axes of the focusing optical elements 2 and 3 coincide with each other, and when a focal length of the focusing optical element 2 is set to $z_1$, and a focal length of the focusing optical element 3 is set to $z_2$, an optical distance between the focusing optical element 2 and the focusing optical element 3 coincides with $z_1+z_2$.

The optical apparatus 1 inputs light L of a single wavelength from a light source 10. The wavelength of the light L is included in, for example, a visible region. The light L is input to the optical apparatus 1 as parallel light. The light source 10 may include a light emitting unit such as a semiconductor laser element and a collimating optical system for collimating the light output from the light emitting unit. The light L is focused by the focusing optical element 2 and once converges, and then reaches the focusing optical element 3 while diverging. The light L is again collimated by the focusing optical element 3, and then output to the outside of the optical apparatus 1.

The angle filter 4 is disposed on an optical path between the focusing optical element 2 and the focusing optical element 3. The angle filter 4 of the present embodiment is a filter of a transmission type. The angle filter 4 functions as a spatial frequency filter which selectively transmits a desired frequency component in a frequency space after passing through the focusing optical element 2.

The angle filter 4 is disposed on an optical path in the middle of focusing or in the middle of divergence by the focusing optical element 2 (on an optical path in the middle of focusing in the example illustrated in the diagram). In addition, the optical path in the middle of focusing refers to an optical path between the focusing optical element 2 and a converging point Q (beam waist), and the optical path in the middle of divergence refers to an optical path between the converging point Q and the focusing optical element 3. The converging point Q is not included in the optical path in the middle of focusing and the optical path in the middle of divergence.

Figure 2:
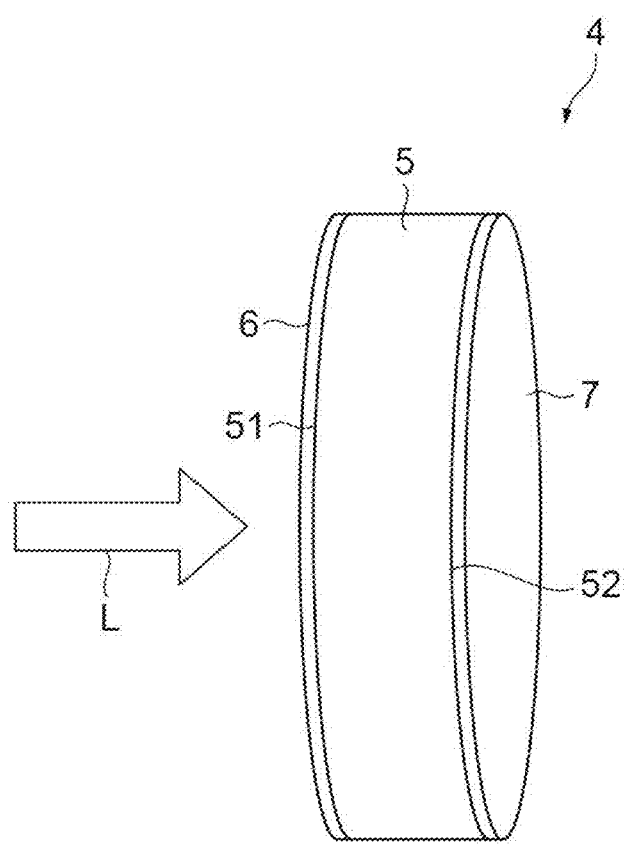
FIG. 2 is a perspective view illustrating an angle filter.

FIG. 2 is a perspective view illustrating the angle filter 4. As illustrated in FIG. 2, the angle filter 4 includes a substrate 5, a dielectric multilayer film 6, and an anti-reflection film 7. The substrate 5 is a flat plate shaped member having a first principal surface 51 and a second principal surface 52 opposite to each other, and has a light transmitting property for the wavelength of the light L. In addition, having the light transmitting property means a property of transmitting 90% or more of light of a target wavelength.

When the wavelength of the light L is included in the visible region, the substrate 5 may be mainly made of, for example, a material such as synthetic quartz or glass (BK-7 in one example). The first principal surface 51 and the second principal surface 52 are both flat and parallel to each other. A direction perpendicular to the first principal surface 51 and the second principal surface 52 coincides with a thickness direction of the substrate 5. The thickness direction of the substrate 5 is along the optical axis direction of the focusing optical elements 2 and 3.

Figure 3:
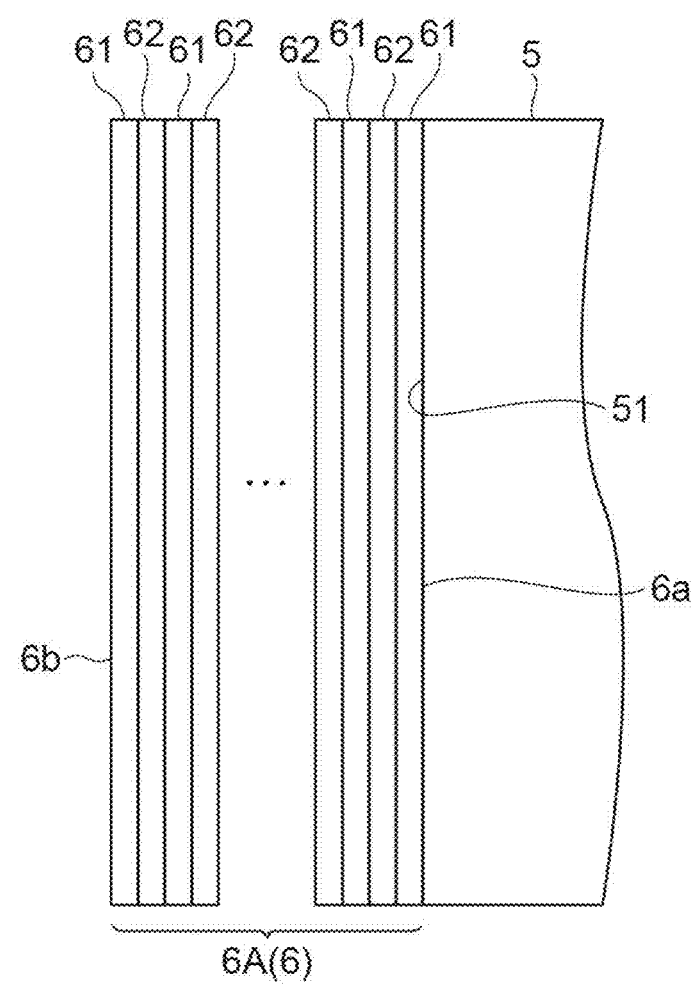
FIG. 3 is a schematic diagram illustrating a configuration example of a dielectric multilayer film.
Figure 4:
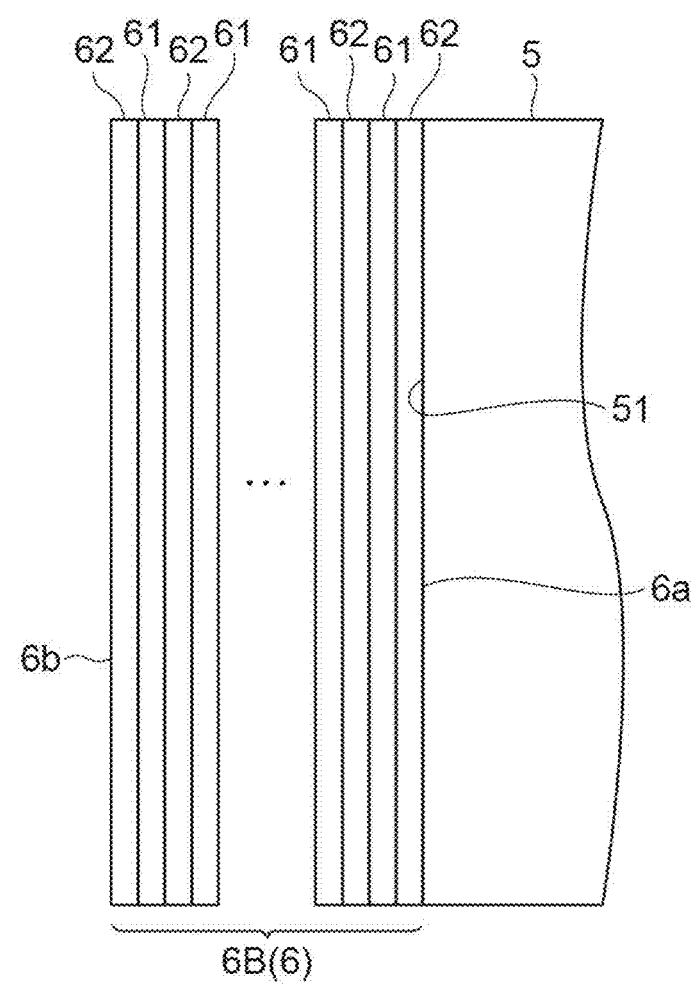
FIG. 4 is a schematic diagram illustrating a configuration example of the dielectric multilayer film.

The dielectric multilayer film 6 is provided on the first principal surface 51. Each of FIG. 3 and FIG. 4 is a schematic diagram illustrating a configuration example of the dielectric multilayer film 6. A dielectric multilayer film 6A is illustrated in FIG. 3, and a dielectric multilayer film 6B is illustrated in FIG. 4. Each of the dielectric multilayer films 6A and 6B has a configuration in which dielectric layers (first dielectric layers) 61 and dielectric layers (second dielectric layers) 62 are alternately stacked.

The dielectric layer 61 has a first refractive index $n_1$. The dielectric layer 62 has a second refractive index $n_2$ being lower than the first refractive index $n_1$. The first refractive index $n_1$ is higher than a refractive index of the substrate 5, and the second refractive index $n_2$ is lower than the refractive index of the substrate 5. In one example, the first refractive index $n_1$ is larger than 1.5, and the second refractive index $n_2$ is smaller than 1.5.

In the dielectric multilayer film 6A illustrated in FIG. 3, the dielectric layer 61 is disposed at one end 6a on the substrate 5 side in the stacking direction. That is, the dielectric multilayer film 6A is stacked in order from the dielectric layer 61 when viewed from the substrate 5 side.

The dielectric layer 61 is disposed also at the other end 6b on the side opposite to the substrate 5 in the stacking direction. In the dielectric multilayer film 6A, for example, synthetic quartz is used as the material of the substrate 5.

In the dielectric multilayer film 6B illustrated in FIG. 4, the dielectric layer 62 is disposed at one end 6a on the substrate 5 side in the stacking direction. That is, the dielectric multilayer film 6B is stacked in order from the dielectric layer 62 when viewed from the substrate 5 side. The dielectric layer 62 is disposed also at the other end 6b on the side opposite to the substrate 5 in the stacking direction. In the dielectric multilayer film 6B, for example, BK-7 is used as the material of the substrate 5.

As constituent materials of the dielectric layers 61 and 62, an inorganic material, an organic material, a semiconductor, a metal, or air can be used.

As the inorganic material constituting the dielectric layer 61 being the high refractive index layer, at least one material included in the group consisting of titanium oxide ($TiO_2$), niobium pentoxide ($Nb_2O_5$), tantalum pentoxide ($Ta_2O_5$), hafnium oxide ($HfO_2$), zirconium dioxide ($ZrO_2$), magnesium oxide (MgO), aluminum oxide ($Al_2O_3$), silicon nitride ($Si_3N_4$), lanthanum fluoride ($LaF_3$), indium oxide ($In_2O_3$), tin-doped indium oxide (ITO), aluminum-doped zinc oxide (AZO), fluorine-doped tin oxide (FTO), IGZO, and carbon (C) may be used.

As the inorganic material constituting the dielectric layer 62 being the low refractive index layer, at least one material included in the group consisting of silicon dioxide ($SiO_2$), aluminum fluoride ($AlF_3$), calcium fluoride ($CaF_2$), magnesium fluoride ($MgF_2$), lithium fluoride (LiF), cryolite ($Na_3AlF_6$), chiolite ($Na_5Al_3F_{14}$), and sodium fluoride (NaF) may be used.

As the organic material constituting the dielectric layer 61 being the high refractive index layer, at least one material included in the group consisting of poly methyl α-bromoacrylate, poly 2,3-dibromopropyl methacrylate, diallyl phthalate, poly phenyl methacrylate, poly vinyl benzoate, polystyrene, poly pentachlorophenyl methacrylate, poly α-chlorostyrene, polyvinyl naphthalene, and polyvinyl carbazole may be used.

As the organic material constituting the dielectric layer 62 being the low refractive index layer, at least one material included in the group consisting of $CF_2$=$CF_2$—$CF_2$=CF ($CF_3$) copolymer, poly trifluoroethyl methacrylate, poly isobutyl methacrylate, poly methyl acrylate, diethylene glycol bis allyl carbonate (CR-39) polymer, poly methyl methacrylate, silicone polymer, cellulose acetate, and poly methyl methacrylate may be used.

As the semiconductor constituting the dielectric layers 61 and 62, at least one material included in the group consisting of silicon (Si), germanium (Ge), gallium arsenide (GaAs), gallium nitride (GaN), indium antimonide (InSb), indium phosphide (InP), gallium phosphide (GaP), aluminum nitride (AlN), indium gallium arsenide (InGaAs), and indium gallium phosphide (InGaP) may be used.

In addition, the refractive index of each of the dielectric layers 61 and 62 can be adjusted by changing a composition ratio of the semiconductor, and can also be adjusted by changing a concentration of the material added to the semiconductor.

As the metal material constituting the dielectric layers 61 and 62, at least one material included in the group consisting of aluminum, chromium, copper, nickel, titanium, gold, silver, platinum, and molybdenum may be used.

When the dielectric layers 61 and 62 are formed of the inorganic material, the semiconductor, or the metal material, the dielectric layers 61 and 62 may be formed by various methods such as vacuum deposition, sputtering, resistance heating deposition, atomic layer deposition, laser ablation, or chemical vapor deposition. Further, when the dielectric layers 61 and 62 are formed of the organic material, the dielectric layers 61 and 62 may be formed by various methods such as spin coating, coating, or printing.

A thickness of each of the dielectric layers 61 and 62 is set according to a desired property required for the angle filter 4. In addition, the dielectric layers 61 and 62 may have a structure such as a metamaterial structure or a Fabry-Perot structure in which the refractive index can be arbitrarily changed from a specific value of the material.

FIG. 2 is referred again. The anti-reflection film 7 is provided on the second principal surface 52. The anti-reflection film 7 includes, for example, a dielectric multilayer film. The anti-reflection film 7 reduces reflection on the second principal surface 52 of the light L to be output from the second principal surface 52 to the outside of the substrate 5. When the wavelength of the light L is included in the visible region, the anti-reflection film 7 may be mainly made of, for example, a material such as $Ta_2O_5$, $Al_2O_3$, or $MgF_2$.

Figure 5:
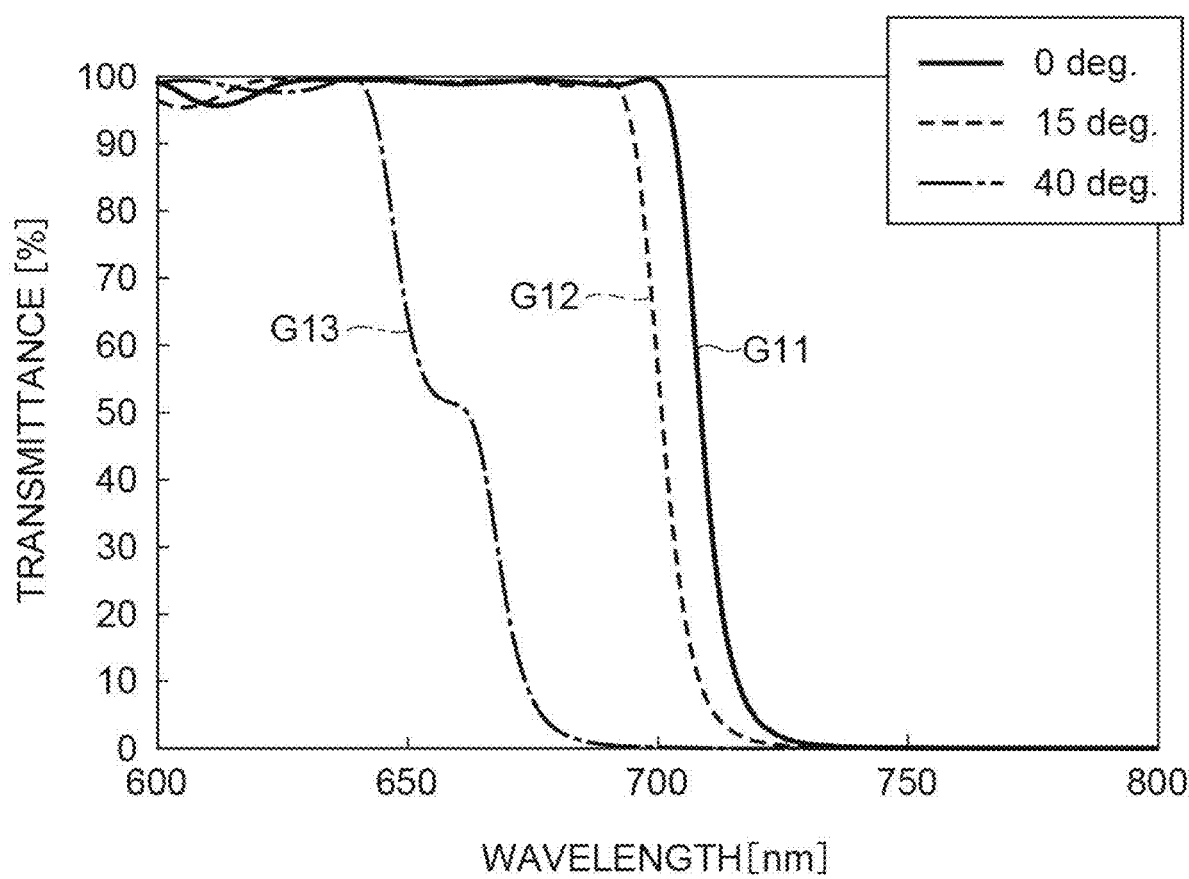
FIG. 5 is a graph showing an example of a relationship between a wavelength of light and a transmittance of the dielectric multilayer film illustrated in FIG. 3.

The property and function of the angle filter 4 will be described. FIG. 5 is a graph showing an example of a relationship between the wavelength of the light L and a transmittance of the dielectric multilayer film 6A illustrated in FIG. 3.

In FIG. 5, the vertical axis indicates the transmittance (unit: %), and the horizontal axis indicates the wavelength (unit: nm). FIG. 5 shows a graph G11 when the incident angle of light for the dielectric multilayer film 6A is set to 0° (that is, the incident direction of light is perpendicular to the surface of the dielectric multilayer film 6A), a graph G12 when the incident angle is set to 15°, and a graph G13 when the incident angle is set to 40°. In this example, the design wavelength is set to 690 nm.

As shown in FIG. 5, the dielectric multilayer film 6A constitutes a lowpass filter which does not transmit light in a wavelength region longer than a certain cutoff wavelength and transmits light in a wavelength region shorter than the cutoff wavelength. In addition, the property changes depending on the incident angle of light, and the cutoff wavelength shifts to the shorter wavelength side as the incident angle increases. This shows that the transmittance of the dielectric multilayer film 6A correlates with the incident angle of light at the specific wavelength.

Figure 6:
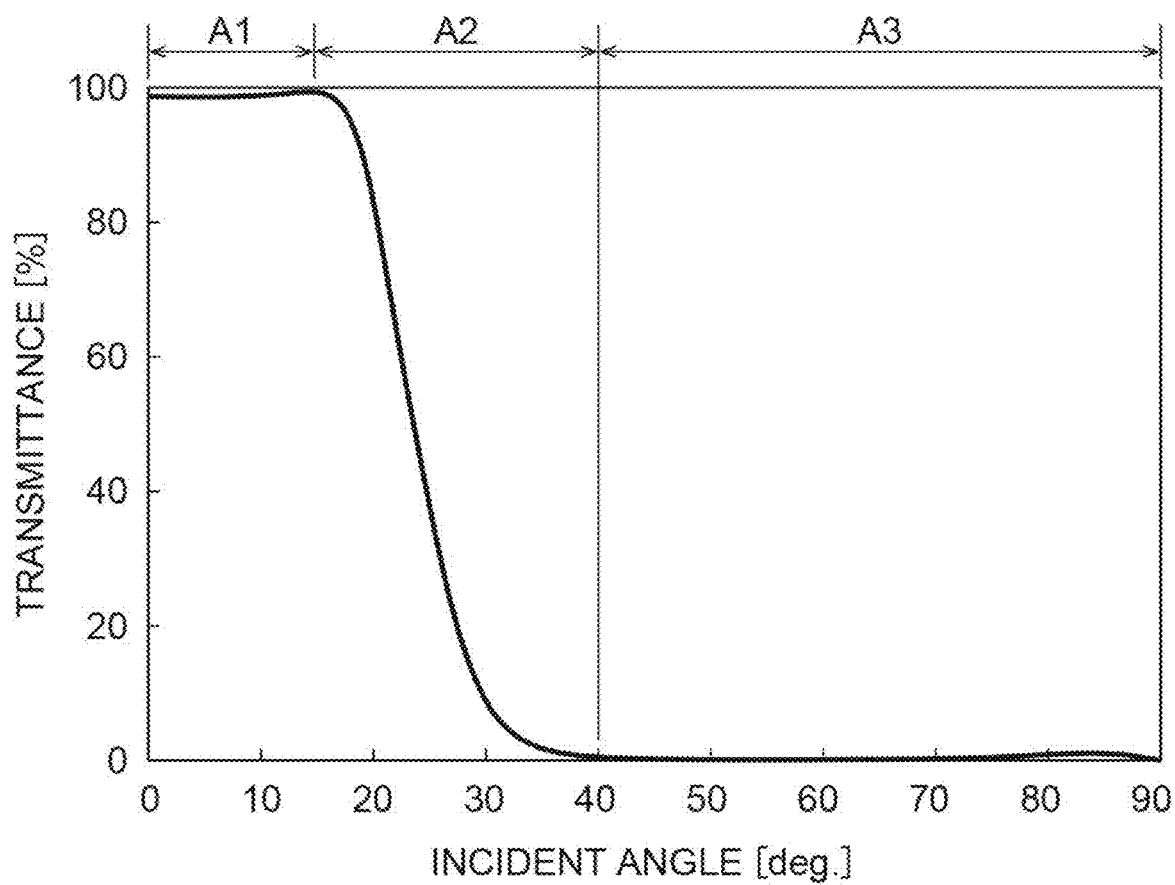
FIG. 6 is a graph showing a relationship between an incident angle of light and a transmittance in the same dielectric multilayer film as that used in FIG. 5.

FIG. 6 is a graph showing a relationship between the incident angle of light and the transmittance in the same dielectric multilayer film 6A as that used in FIG. 5. In FIG. 6, the vertical axis indicates the transmittance (unit: %), and the horizontal axis indicates the incident angle (unit: degree).

As shown in FIG. 6, in this example, in a region A1 where the incident angle is relatively small, such as 15° or less, the transmittance of the dielectric multilayer film 6A asymptotically approaches 100%. Further, in a region A3 where the incident angle is relatively large, such as 40° or more, the transmittance of the dielectric multilayer film 6A asymptotically approaches 0%, and almost all of the light is reflected. Further, in a region A2 between the regions A1 and A3, the transmittance monotonically decreases with respect to the incident angle, and further, the transmittance continuously and gently decreases from 100% to 0%.

An absolute value of a change rate of the transmittance with respect to the incident angle in the region A2 is, for example, 20% or less per unit angle (1°). Further, an angle change amount when the transmittance changes from 80% to 20% is, for example, 5° or more and 60° or less. In addition, in the following description, an angle at which the transmittance is 50% is defined as a cutoff angle.

In order to set the change rate (that is, a slope of the graph) of the transmittance with respect to the incident angle in the region A2 of the graph shown in FIG. 6 to a desired magnitude, the repetition number of the dielectric layers 61 and 62 may be adjusted. As the repetition number of the dielectric layers 61 and 62 increases, the absolute value of the change rate of the transmittance with respect to the incident angle increases, and the slope of the graph becomes steeper. In other words, as the repetition number of the dielectric layers 61 and 62 decreases, the absolute value of the change rate of the transmittance with respect to the incident angle decreases, and the slope of the graph becomes gentler.

In order to set the cutoff angle to a desired magnitude, the thicknesses of the dielectric layers 61 and 62 may be adjusted. As the dielectric layers 61 and 62 become thicker, the cutoff angle moves to the longer wavelength side. In other words, as the dielectric layers 61 and 62 become thinner, the cutoff angle moves to the shorter wavelength side.

Figure 7:
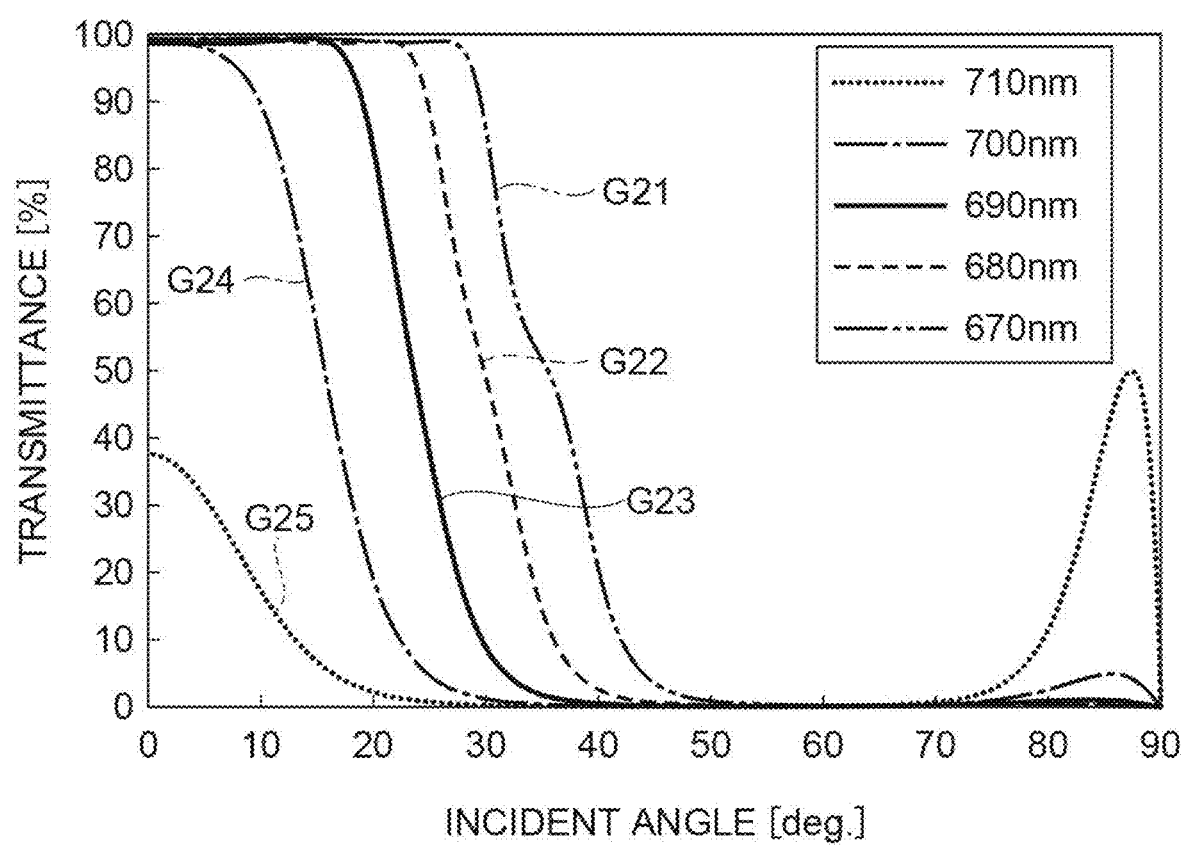
FIG. 7 is a graph showing a relationship between an incident angle and a transmittance when a design wavelength is set to 690 nm.

FIG. 7 is a graph showing a relationship between the incident angle and the transmittance in the case where the design wavelength is set to 690 nm, and shows a case where the wavelength is 690 nm (graph G23), and in addition, shows a case where the wavelength is 670 nm (graph G21), a case where the wavelength is 680 nm (graph G22), a case where the wavelength is 700 nm (graph G24), and a case where the wavelength is 710 nm (graph G25). In FIG. 7, the vertical axis indicates the transmittance (unit: %), and the horizontal axis indicates the incident angle (unit: degree).

As shown in FIG. 7, it can be seen that the cutoff angle shifts to the lower angle side as the wavelength increases.

As described above, in the dielectric multilayer film 6A illustrated in FIG. 3, the dielectric layer 61 being the high refractive index layer is disposed at the one end 6a on the substrate 5 side in the stacking direction. In this case, as shown in FIG. 6, the dielectric multilayer film 6A functions as the lowpass filter which transmits light having the incident angle smaller than the cutoff angle and reflects light having the incident angle larger than the cutoff angle.

Figure 8:
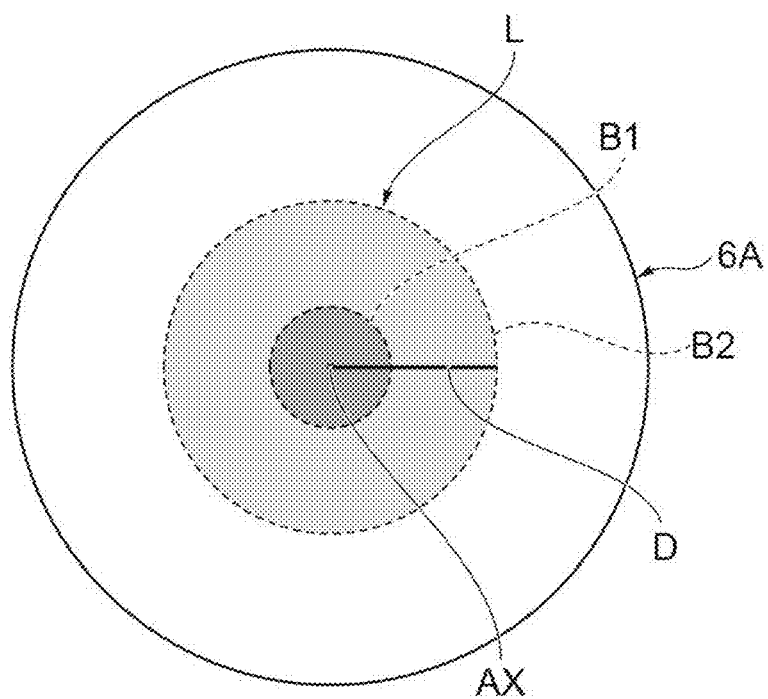
FIG. 8 is a plan view illustrating a state in which light is incident on the dielectric multilayer film as viewed from an optical axis direction.

FIG. 8 is a plan view illustrating a state in which the light L is incident on the dielectric multilayer film 6A as viewed from the optical axis direction. The light L passing through the focusing optical element 2 is incident on the dielectric multilayer film 6A while being focused or diverged. Therefore, in the light L, the incident angle of light included in a central region B1 including an optical axis AX of the focusing optical element 2 is smaller than the cutoff angle, and the incident angle of light included in a peripheral region B2 surrounding the central region B1 is larger than the cutoff angle. Accordingly, the dielectric multilayer film 6A transmits the light included in the central region B1 and reflects the light included in the peripheral region B2.

Due to a Fourier transform function by the focusing optical element 2, a frequency (or a diffraction order) of the light included in the central region B1 is small, and a frequency (or a diffraction order) of the light included in the peripheral region B2 is large. Thus, the dielectric multilayer film 6A transmits a low frequency component and reflects a high frequency component. Therefore, when the angle filter 4 is used as the transmission type filter as illustrated in FIG. 1, the optical apparatus 1 can be used as a frequency filter which selectively extracts only the low frequency component.

In particular, by reducing the repetition number of the dielectric layers 61 and 62 so that the absolute value of the change rate of the transmittance with respect to the incident angle in the region A2 of FIG. 6 becomes small, it is possible to realize an apodization filter which reduces high-order diffracted light and improves low frequency contrast. Further, it is also possible to use the angle filter 4 as a reflection type filter, and in this case, the optical apparatus can be used as a frequency filter which selectively extracts only the high frequency component.

Figure 9:
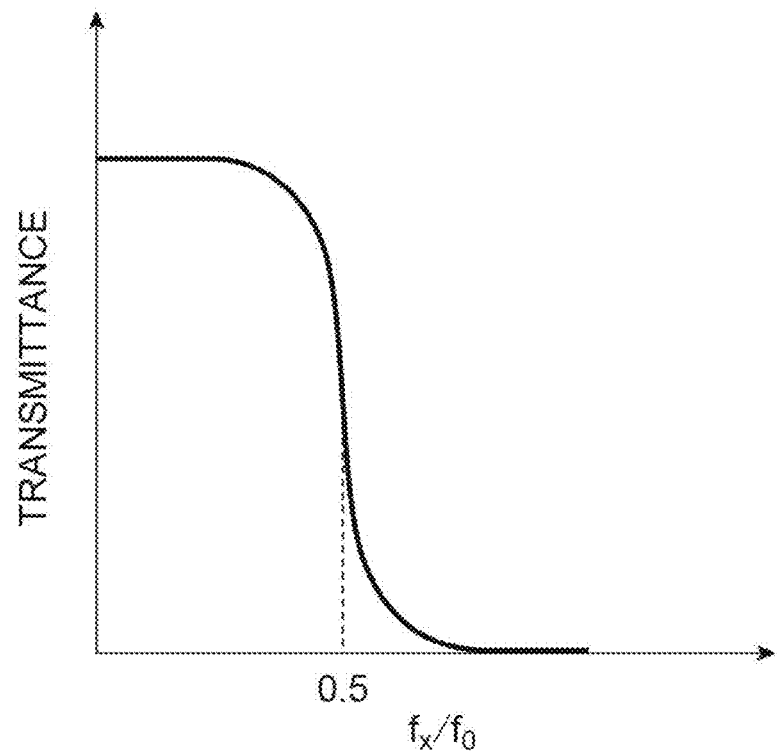
FIG. 9 includes (a) a graph conceptually showing a desired frequency-transmission property on a line segment illustrated in FIG. 8, and (b) a graph conceptually showing an incident angle-transmission property.
Figure 9:
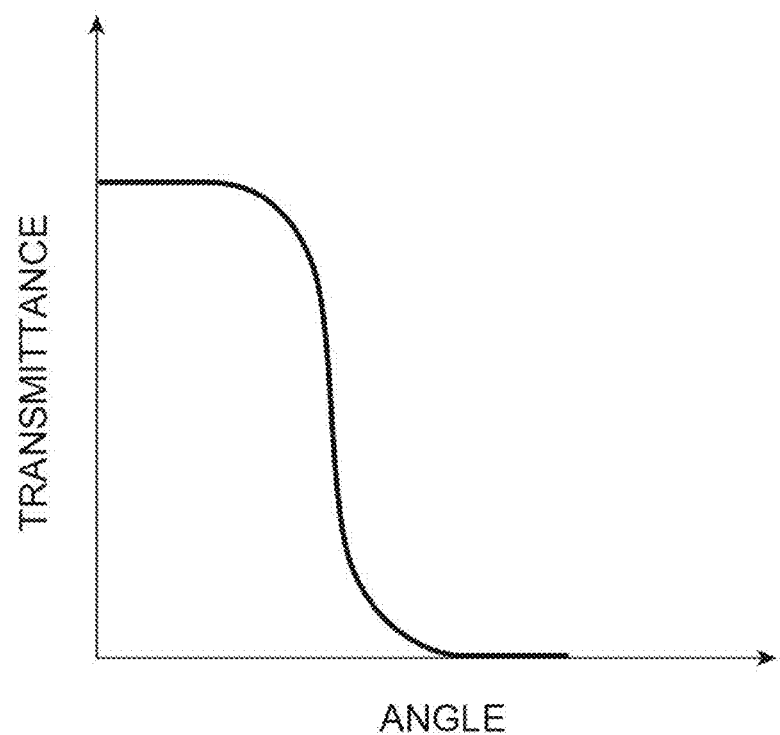

In order to quantitatively design the dielectric multilayer film 6A, a frequency property desired for the dielectric multilayer film 6A may be converted into an incident angle property. (a) in FIG. 9 is a graph conceptually showing a frequency-transmission property on a line segment D illustrated in FIG. 8. In (a) in FIG. 9, the horizontal axis indicates a ratio $f_x/f_0$ between a cutoff frequency $f_0$ of the focusing optical element 2 and a frequency component $f_x$, and the vertical axis indicates the transmittance. The angular property is obtained by converting the ratio $f_x/f_0$ into an angle component $\theta_x$ based on the frequency property.

Assuming that one component of a wave number vector is $k_x=2\pi\alpha/\lambda$, where $\alpha$ is $\sin\theta_x$ and the wavelength of the light L is $\lambda$, the frequency component is $f_x=\alpha/\lambda$, and thus, the angle component $\theta_x$ can be expressed as $\sin^{-1}(\lambda \cdot f_x)$. Further, the cutoff frequency $f_0$ is calculated as $w/(\lambda \cdot z_1)$ from an effective diameter w of a lens aperture and the focal length $z_1$ of the focusing optical element 2. Thus, the angle component $\theta_x$ is calculated as follows.

$$\theta_x = \sin^{-1}(\lambda \cdot \beta \cdot f_0), 0 < \beta < 1$$

(b) in FIG. 9 is a graph conceptually showing an incident angle-transmission property calculated as described above. As shown in (b) in FIG. 9, a shape of the incident angle-transmission property is similar to a shape of the frequency-transmission property shown in (a) in FIG. 9, and the incident angle property can be easily calculated from the desired frequency property.

Figure 10:
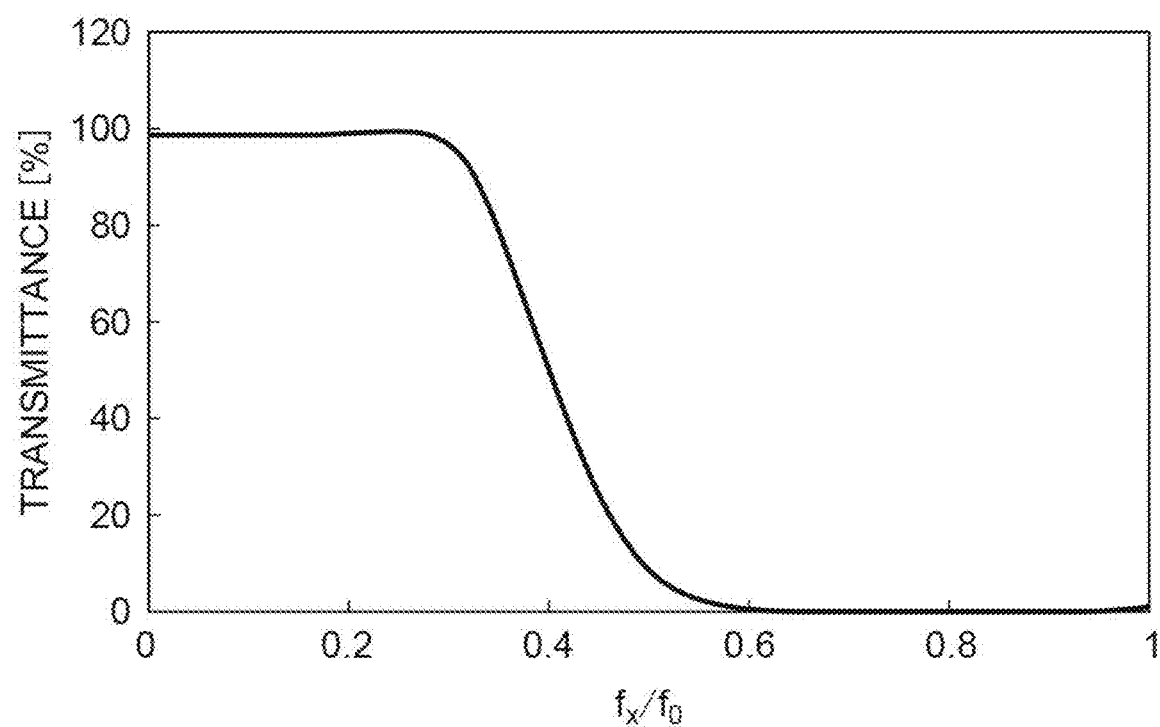
FIG. 10 is a graph showing an example of a frequency property desired for the dielectric multilayer film.
Figure 11:
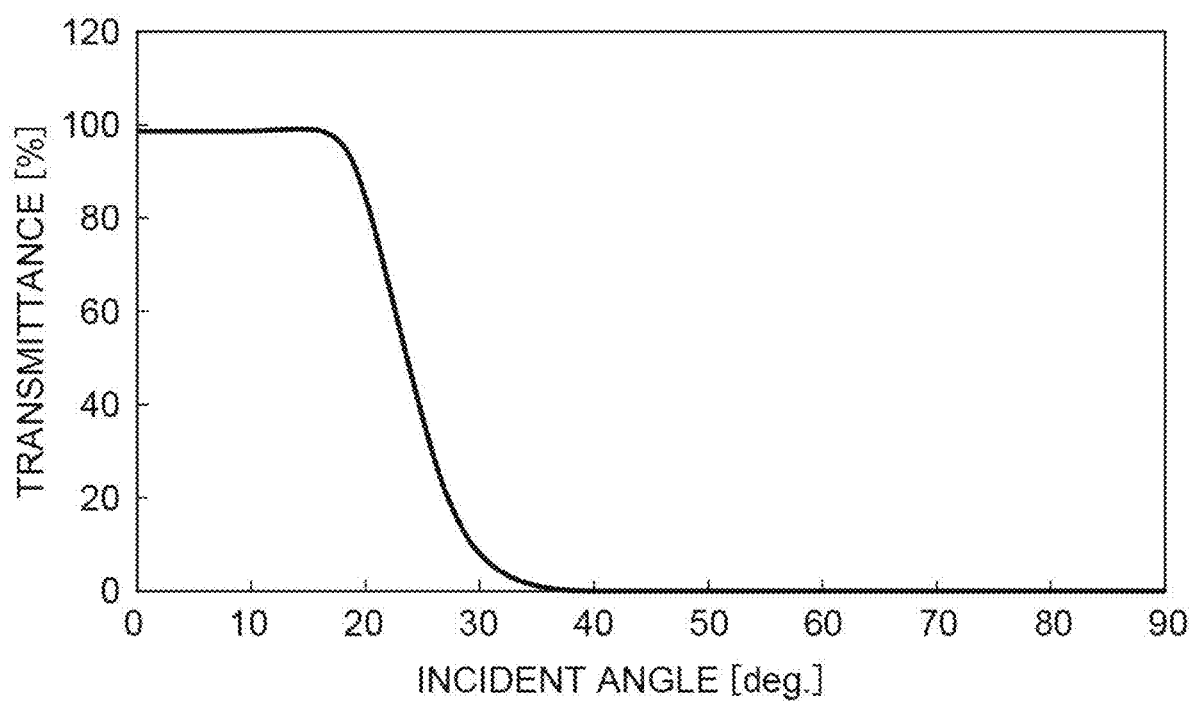
FIG. 11 is a graph showing an incident angle-transmission property.

FIG. 10 is a graph showing an example of the frequency property desired for the dielectric multilayer film 6A. For example, when the incident angle property according to this frequency property is designed, the result is as shown in FIG. 11. In this case, the lens aperture of the focusing optical elements 2 and 3 is set to 10 mm, the focal length $z_1$ of the focusing optical element 2 is set to 10 mm, and the design wavelength $\lambda$ is set to 690 nm.

Figure 12:
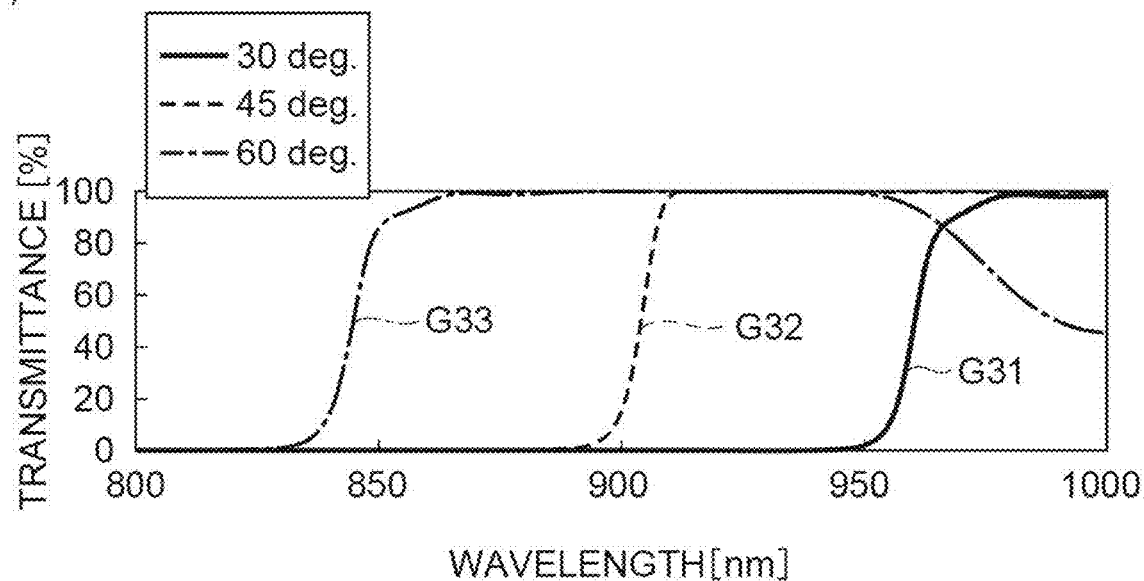
FIG. 12 includes (a) a graph showing an example of a relationship between a wavelength of light and a transmittance of the dielectric multilayer film illustrated in FIG. 4, and (b) a graph showing a relationship between an incident angle of light and a transmittance.
Figure 12:
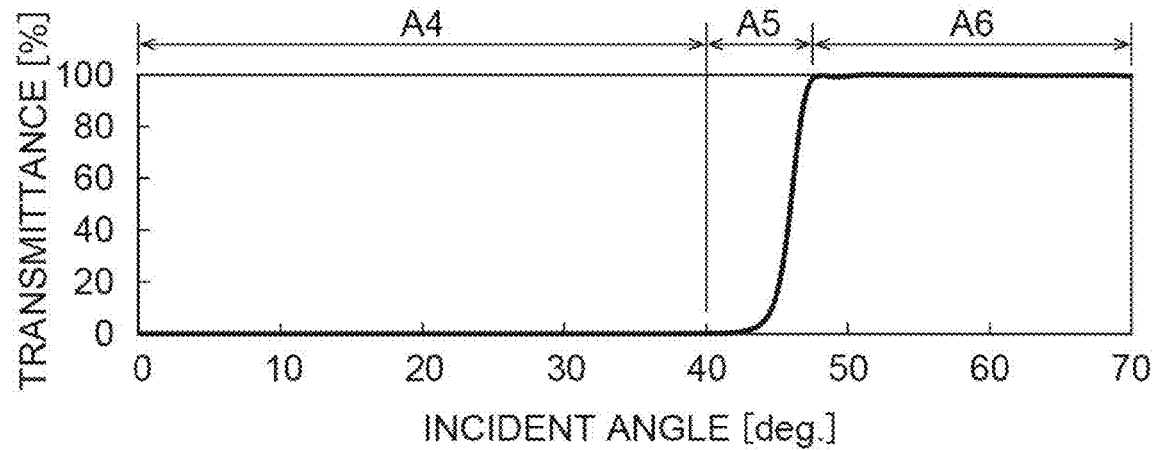

(a) in FIG. 12 is a graph showing an example of a relationship between the transmittance of the dielectric multilayer film 6B illustrated in FIG. 4 and the wavelength of the light L. In (a) in FIG. 12, the vertical axis indicates the transmittance (unit: %), and the horizontal axis indicates the wavelength (unit: nm). (a) in FIG. 12 shows a graph G31 when the incident angle of light for the dielectric multilayer film 6B is set to 30°, a graph G32 when the incident angle is set to 45°, and a graph G33 when the incident angle is set to 60°. In this example, the design wavelength is set to 900 nm.

As shown in (a) in FIG. 12, the dielectric multilayer film 6B constitutes a highpass filter which transmits light in a wavelength region longer than a certain cutoff wavelength and does not transmit light in a wavelength region shorter than the cutoff wavelength. In addition, the property changes depending on the incident angle of light, and the cutoff wavelength shifts to the shorter wavelength side as the incident angle increases. This shows that the transmittance of the dielectric multilayer film 6B correlates with the incident angle of light at the specific wavelength.

(b) in FIG. 12 is a graph showing a relationship between the incident angle of light and the transmittance in the same dielectric multilayer film 6B as that used in (a) in FIG. 12. In (b) in FIG. 12, the vertical axis indicates the transmittance (unit: %), and the horizontal axis indicates the incident angle (unit: degree).

As shown in (b) in FIG. 12, in this example, in a region A4 where the incident angle is relatively small, such as 40° or less, the transmittance of the dielectric multilayer film 6B asymptotically approaches 0%, and almost all of the light is reflected. Further, in a region A6 where the incident angle is relatively large, such as 50° or more, the transmittance of the dielectric multilayer film 6B asymptotically approaches 100%. Further, in a region A5 between the regions A4 and A6, the transmittance monotonously increases with respect to the incident angle, and further, the transmittance continuously and gently increases from 0% to 100%.

The absolute value of the change rate of the transmittance with respect to the incident angle in the region A5 is, for example, 20% or less per unit angle. Further, the angle change amount when the transmittance changes from 20% to 80% is, for example, 5° or more and 60° or less.

In order to set the change rate (that is, the slope of the graph) of the transmittance with respect to the incident angle in the region A5 of the graph shown in (b) FIG. 12 to a desired magnitude, the repetition number of the dielectric layers 61 and 62 may be adjusted. As the repetition number of the dielectric layers 61 and 62 increases, the absolute value of the change rate of the transmittance with respect to the incident angle increases, and the slope of the graph becomes steeper. In other words, as the repetition number of the dielectric layers 61 and 62 decreases, the absolute value of the change rate of the transmittance with respect to the incident angle decreases, and the slope of the graph becomes gentler.

In order to set the cutoff angle to a desired magnitude, the thicknesses of the dielectric layers 61 and 62 may be adjusted. As the dielectric layers 61 and 62 become thicker, the cutoff angle moves to the longer wavelength side. In other words, as the dielectric layers 61 and 62 become thinner, the cutoff angle moves to the shorter wavelength side.

As described above, in the dielectric multilayer film 6B illustrated in FIG. 4, the dielectric layer 62 being the low refractive index layer is disposed at the one end 6a on the substrate 5 side in the stacking direction. In this case, as shown in (b) in FIG. 12, the dielectric multilayer film 6B functions as the highpass filter which reflects light having the incident angle smaller than the cutoff angle and transmits light having the incident angle larger than the cutoff angle.

That is, the dielectric multilayer film 6B reflects the light included in the central region B1 illustrated in FIG. 8 and transmits the light included in the peripheral region B2. Thus, the dielectric multilayer film 6B reflects the low frequency component and transmits the high frequency component. Therefore, when the angle filter 4 is used as the transmission type filter as illustrated in FIG. 1, the optical apparatus 1 can be used as a frequency filter which selectively extracts only the high frequency component.

In particular, by reducing the repetition number of the dielectric layers 61 and 62 so that the absolute value of the change rate of the transmittance with respect to the incident angle in the region A5 becomes small, it is possible to realize an anti-apodization filter (super resolution filter) which reduces low-order diffracted light and improves high frequency contrast. Further, it is also possible to use the angle filter 4 as the reflection type filter, and in this case, the optical apparatus can be used as a frequency filter which selectively extracts only the low frequency component.

Figure 13:
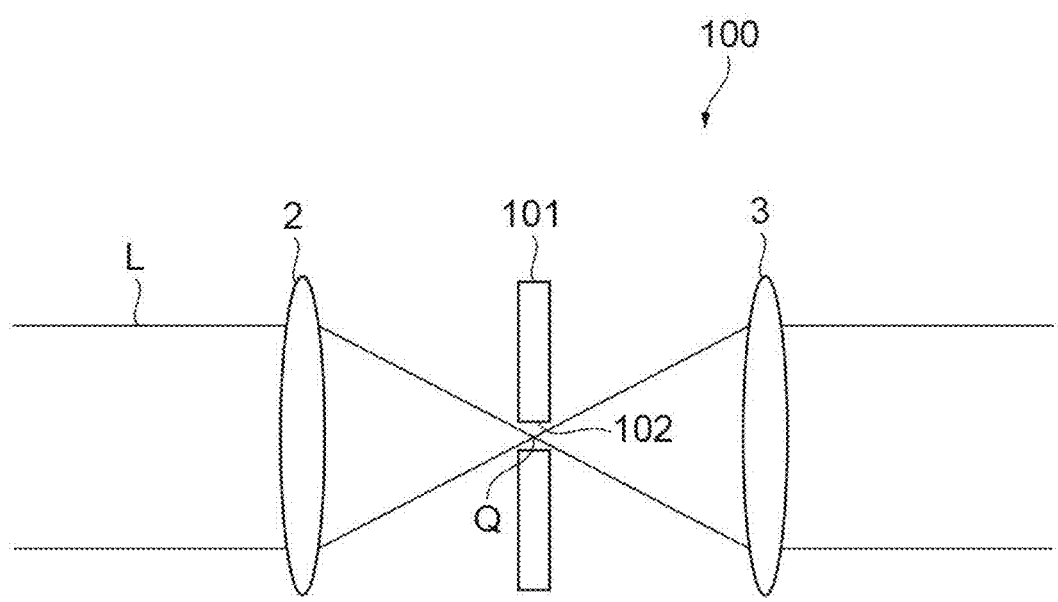
FIG. 13 is a diagram schematically illustrating a configuration of an optical apparatus as a comparative example.

Effects obtained by the optical apparatus 1 of the present embodiment described above will be described together with a comparative example. FIG. 13 is a diagram schematically illustrating a configuration of an optical apparatus 100 as the comparative example.

The optical apparatus 100 is a spatial frequency filter, and includes focusing optical elements 2 and 3 constituting a 4f optical system and a spatial filter 101. The spatial filter 101 has an aperture 102 of an arbitrary shape for removing a desired frequency, and is disposed on a Fourier plane including a rear focal point of the focusing optical element 2.

Figure 14:
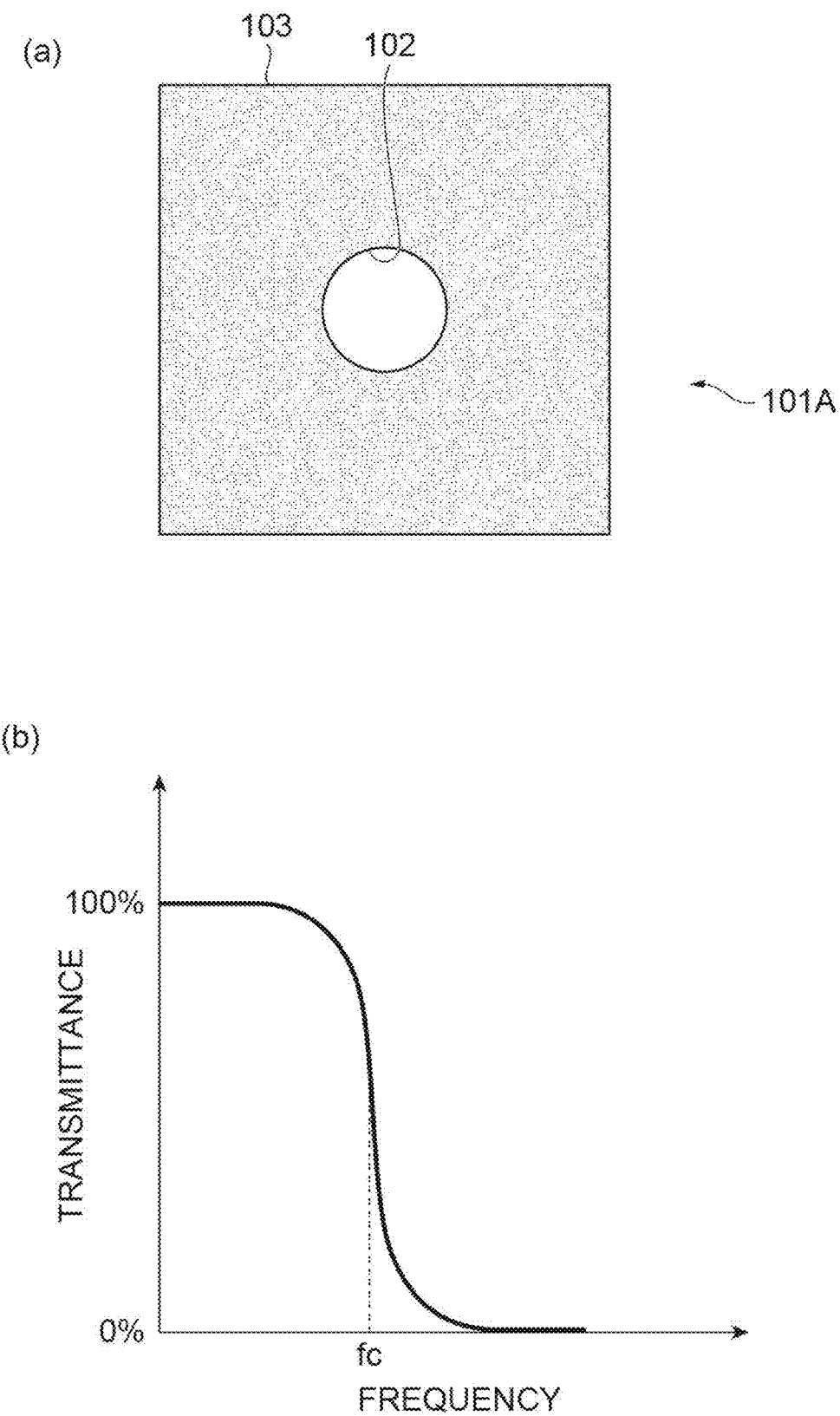
FIG. 14 includes (a) a diagram illustrating a planar shape of a spatial filter, and (b) a graph conceptually showing a transmission property of the optical apparatus.

(a) in FIG. 14 is a diagram illustrating a planar shape (shape viewed from the optical axis direction) of a spatial filter 101A as an example of the spatial filter 101. In this example, a circular aperture 102 centered on the optical axis AX of the focusing optical element 2 is formed in the spatial filter 101A, and a periphery of the aperture 102 constitutes a shielding portion 103.

(b) in FIG. 14 is a graph conceptually showing the transmission property of the optical apparatus 100 when the optical apparatus 100 includes the spatial filter 101A. In (b) in FIG. 14, the vertical axis indicates the transmittance, and the horizontal axis indicates the frequency. In the diagram, fc is the cutoff frequency.

As shown in (b) in FIG. 14, when the optical apparatus 100 includes the spatial filter 101A, the apparatus functions as the lowpass filter which transmits light having the frequency lower than the cutoff frequency fc. Further, when the transmittance of light is gently changed at a boundary between the aperture 102 and the shielding portion 103, the apodization filter can be obtained.

Figure 15:
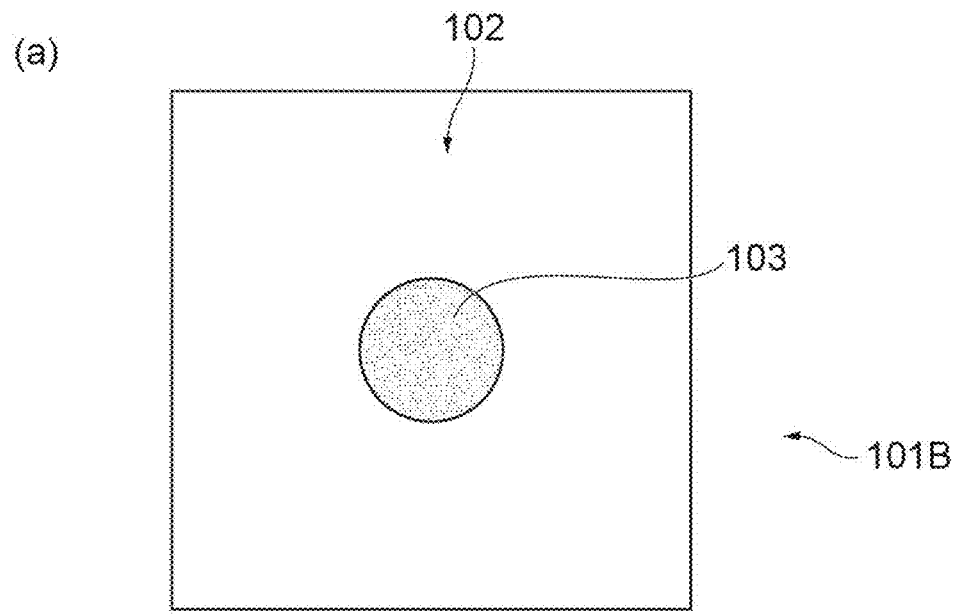
FIG. 15 includes (a) a diagram illustrating a planar shape of a spatial filter, and (b) a graph conceptually showing a transmission property of the optical apparatus.
Figure 15:
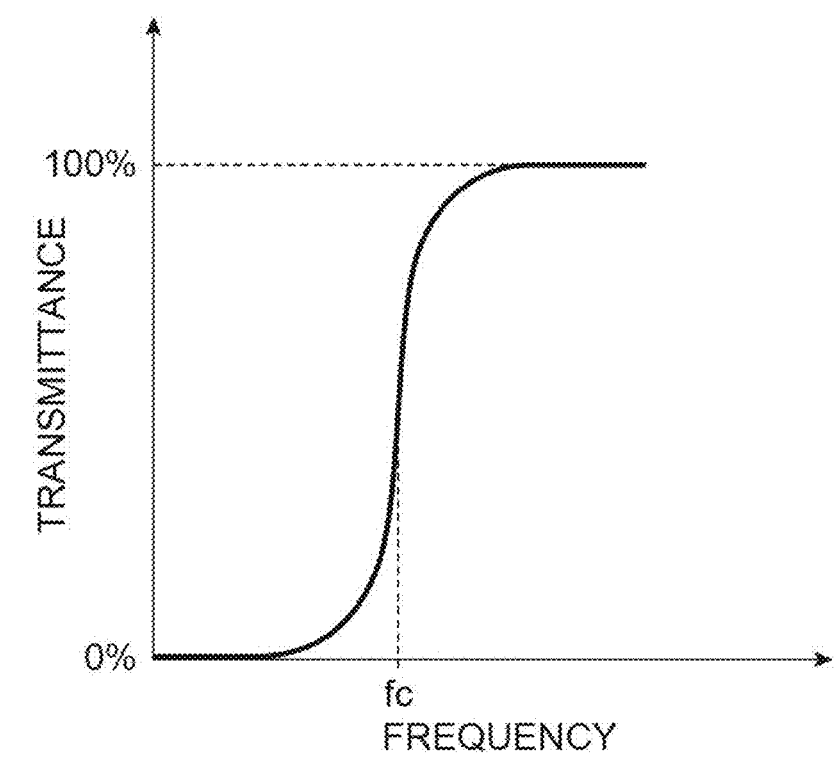

(a) in FIG. 15 is a diagram illustrating a planar shape of a spatial filter 101B as another example of the spatial filter 101. In this example, a circular shielding portion 103 centered on the optical axis AX of the focusing optical element 2 is disposed, and a periphery of the shielding portion 103 constitutes an aperture 102.

(b) in FIG. 15 is a graph conceptually showing the transmission property of the optical apparatus 100 when the optical apparatus 100 includes the spatial filter 101B. In (b) in FIG. 15, the vertical axis indicates the transmittance, and the horizontal axis indicates the frequency.

As shown in (b) in FIG. 15, when the optical apparatus 100 includes the spatial filter 101B, the apparatus functions as the highpass filter which transmits light having the frequency higher than the cutoff frequency fc. Further, when the transmittance of light is gently changed at a boundary between the aperture 102 and the shielding portion 103, the anti-apodization filter (super resolution filter) can be obtained.

In the optical apparatus 100 illustrated in FIG. 13, it is necessary to perform optical axis adjustment between the focusing optical element 2 and the spatial filter 101 with extremely high accuracy (for example, the same degree as a focusing spot size of light). This is because when the optical axis of the focusing optical element 2 and the optical axis of the spatial filter 101 deviate even slightly from each other, the frequency property changes, and the frequency component to be extracted or removed deviates from the desired frequency.

However, a mechanically precisely adjusted relative position between the focusing optical element 2 and the spatial filter 101 is susceptible to external factors such as vibration and temperature. Therefore, the frequency property may vary due to the external factors.

As described above, the transmittance and the reflectance of the dielectric multilayer film 6 of the present embodiment change according to the incident angle of light, and the property thereof can be controlled by the layer structure (the thickness of each layer, the number of stacked layers, and the material) of the dielectric multilayer film 6. Further, when the dielectric multilayer film 6 is disposed on the optical path of the light L in the middle of focusing or in the middle of divergence, the incident angle of light changes according to the distance from the center (optical axis AX) of the optical path. Therefore, according to the optical apparatus 1 of the present embodiment, the desired frequency component can be selectively transmitted or reflected in the frequency space after passing through the focusing optical element 2, and the spatial frequency filter can be suitably realized.

Further, a change in relative positional relationship between the focusing optical element 2 and the dielectric multilayer film 6 does not change the incident angle and has little effect on the above filter function. Therefore, according to the optical apparatus 1 of the present embodiment, compared to the configuration in which the spatial filter 101 having the aperture 102 is disposed on the Fourier plane including the rear focal point of the focusing optical element 2, it is possible to significantly suppress a change in frequency property caused by a change in relative position between the focusing optical element 2 and the filter.

As in the present embodiment, the distribution of the transmittance or the reflectance of the dielectric multilayer film 6 with respect to the incident angle on the dielectric multilayer film 6 at the wavelength of the light L propagating through the optical path may include the region A2 or A5 (see FIG. 6 and (b) in FIG. 12) in which the transmittance or the reflectance monotonically increases or monotonically decreases with respect to the incident angle. Further, the absolute value of the change rate of the transmittance or the reflectance with respect to the incident angle in the region A2 or A5 may be 20% or less per unit angle.

In this case, in the regions A2 and A5, the transmittance or the reflectance gently changes with respect to the incident angle. Therefore, the optical apparatus 1 can be used as, for example, the apodization filter or the anti-apodization filter (super resolution filter).

As in the present embodiment, the angle filter 4 may include the substrate 5 having the light transmitting property at the wavelength of the light L propagating through the optical path. Further, the substrate 5 may include the first principal surface 51 on which the dielectric multilayer film 6 is provided and the second principal surface 52 opposite to the first principal surface 51 and on which the anti-reflection film 7 is provided.

As described above, by using the configuration in which the angle filter 4 includes the substrate 5 having the light transmitting property, the dielectric multilayer film 6 having a thin film shape can be suitably formed. Further, when the light reflected by the second principal surface 52 is reflected again by the first principal surface 51, the light is superimposed on the output light, and affects the filter property. By providing the anti-reflection film 7 on the second principal surface 52 opposite to the first principal surface 51 on which the dielectric multilayer film 6 is provided out of the two principal surfaces 51 and 52 of the substrate 5, it is possible to reduce the reflection on the second principal surface 52, and suppress the influence on the filter property caused by the reflection.

As in the present embodiment, the optical apparatus 1 may include the other focusing optical element 3 being disposed at the subsequent stage of the focusing optical element 2 and constituting the 4f optical system together with the focusing optical element 2. Further, the angle filter 4 may be disposed on the optical path between the focusing optical element 2 and the focusing optical element 3. In this case, the spatial frequency filter of the transmission type which outputs parallel light including only the desired frequency component can be obtained.

Example

An example in which the angle filter 4 of the above embodiment is actually formed will be described. In this example, the design center wavelength is set to 633 nm, the high refractive index layer of the dielectric multilayer film is constituted by $Ta_2O_5$, and the low refractive index layer is constituted by $SiO_2$.

Figure 16:
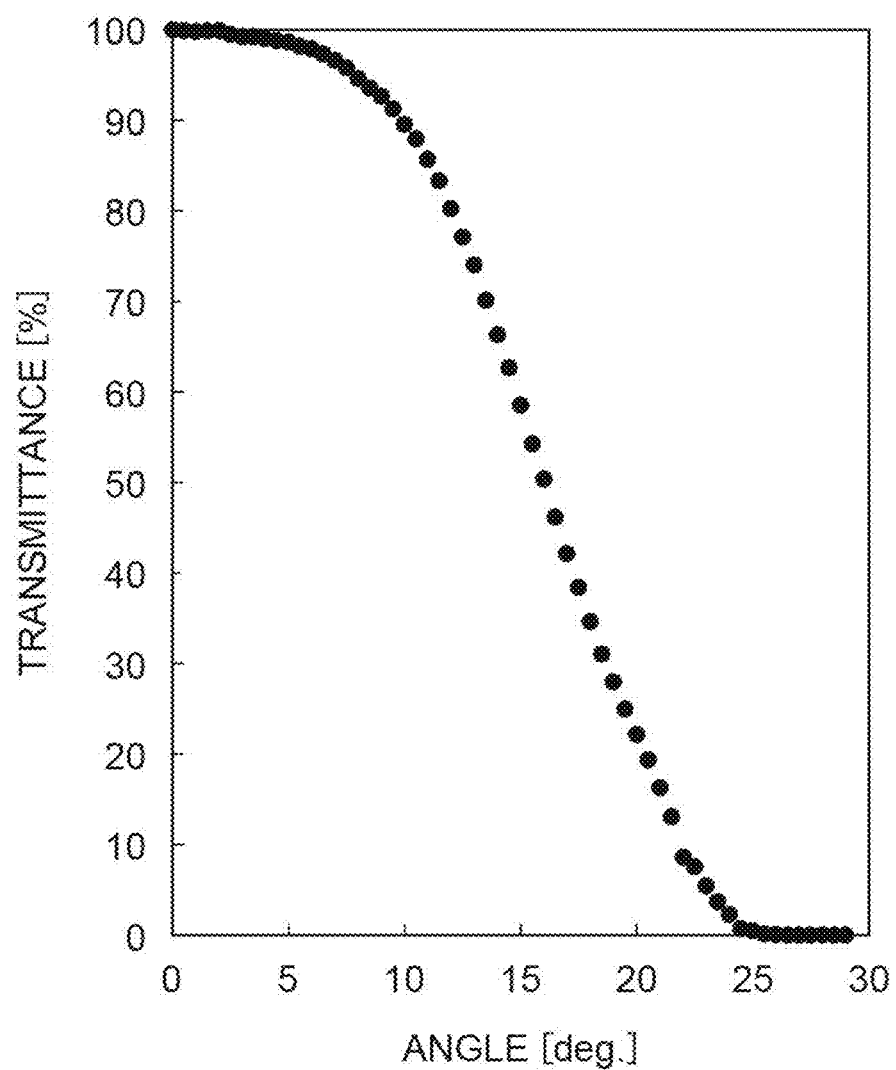
FIG. 16 is a graph showing a relationship between an incident angle and a transmittance of the angle filter at a wavelength of 633 nm, which is obtained by an example.
Figure 17:
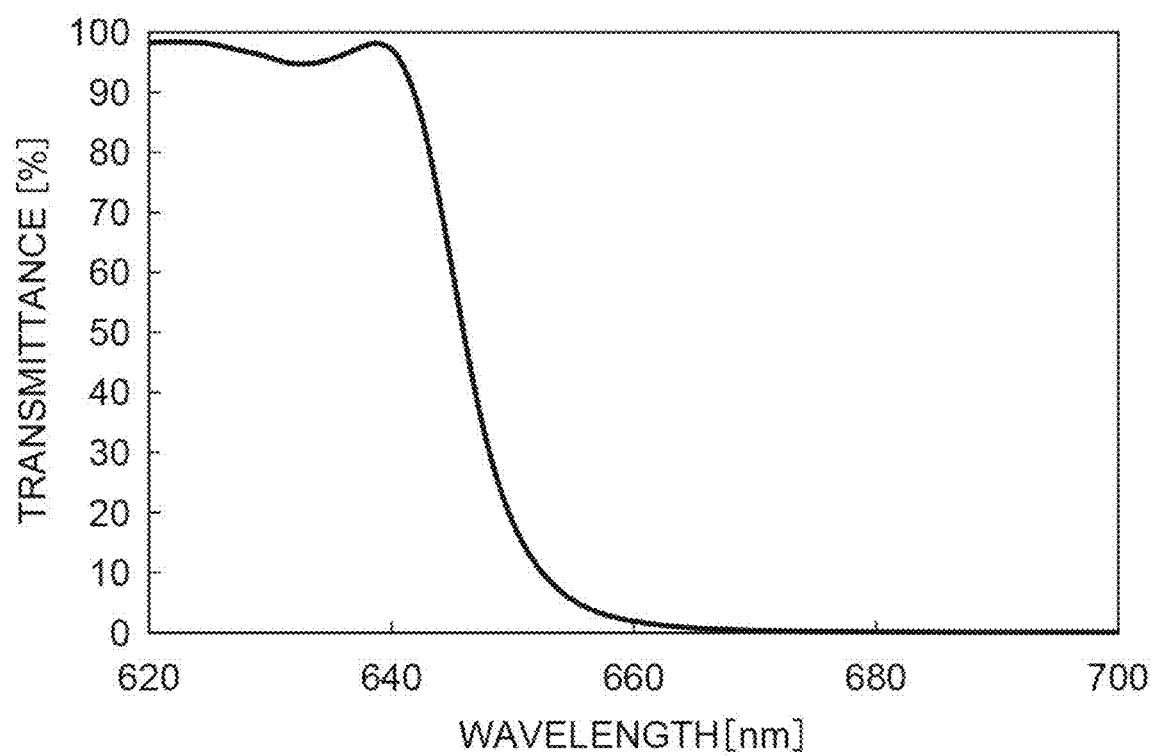
FIG. 17 is a graph showing a wavelength-transmittance property of the dielectric multilayer film.

FIG. 16 is a graph showing a relationship between the incident angle and the transmittance of the angle filter at the wavelength of 633 nm, obtained by the above example. As shown in FIG. 16, the transmittance gradually decreases from 0° to 25°, and the transmittance asymptotically approaches 0% when the incident angle exceeds 25°. As described above, the angle filter, being the lowpass filter having a gentle incident angle-transmittance property in which the transmittance changes from 100% to 0% while the incident angle changes from 0° to 25°, was formed. For reference, a wavelength-transmittance property of the dielectric multilayer film is shown in FIG. 17.

Figure 18:
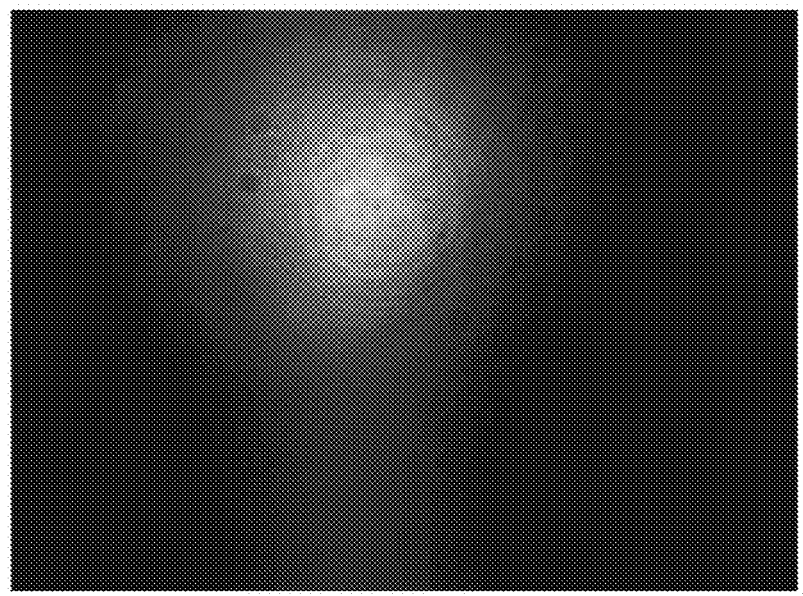
FIG. 18 includes (a) a diagram showing data obtained by imaging light immediately after passing through a focusing optical element in an example, and (b) a diagram showing imaging data in a case where the angle filter is not disposed.
Figure 18:
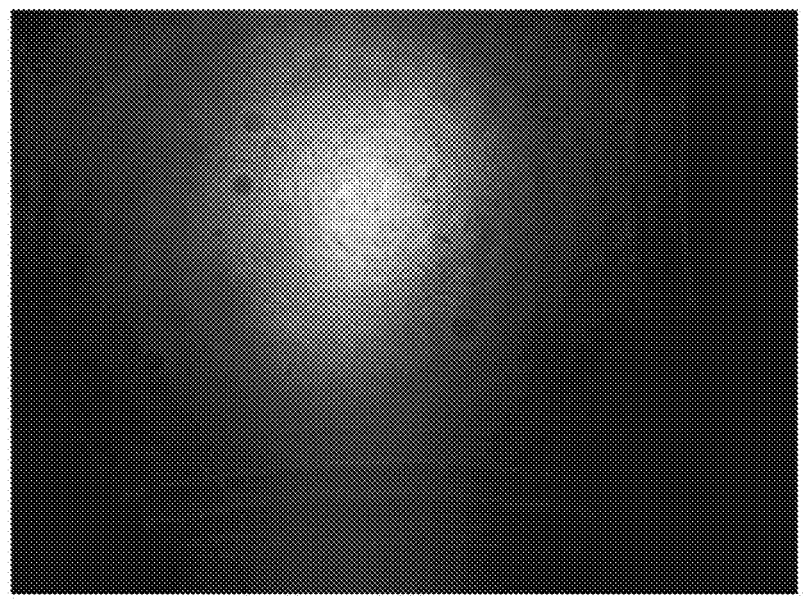

(a) in FIG. 18 is a diagram showing data obtained by imaging light immediately after passing through the focusing optical element 3 in the present example. For comparison, imaging data in the case where the angle filter is not disposed is shown in (b) in FIG. 18.

Figure 19:
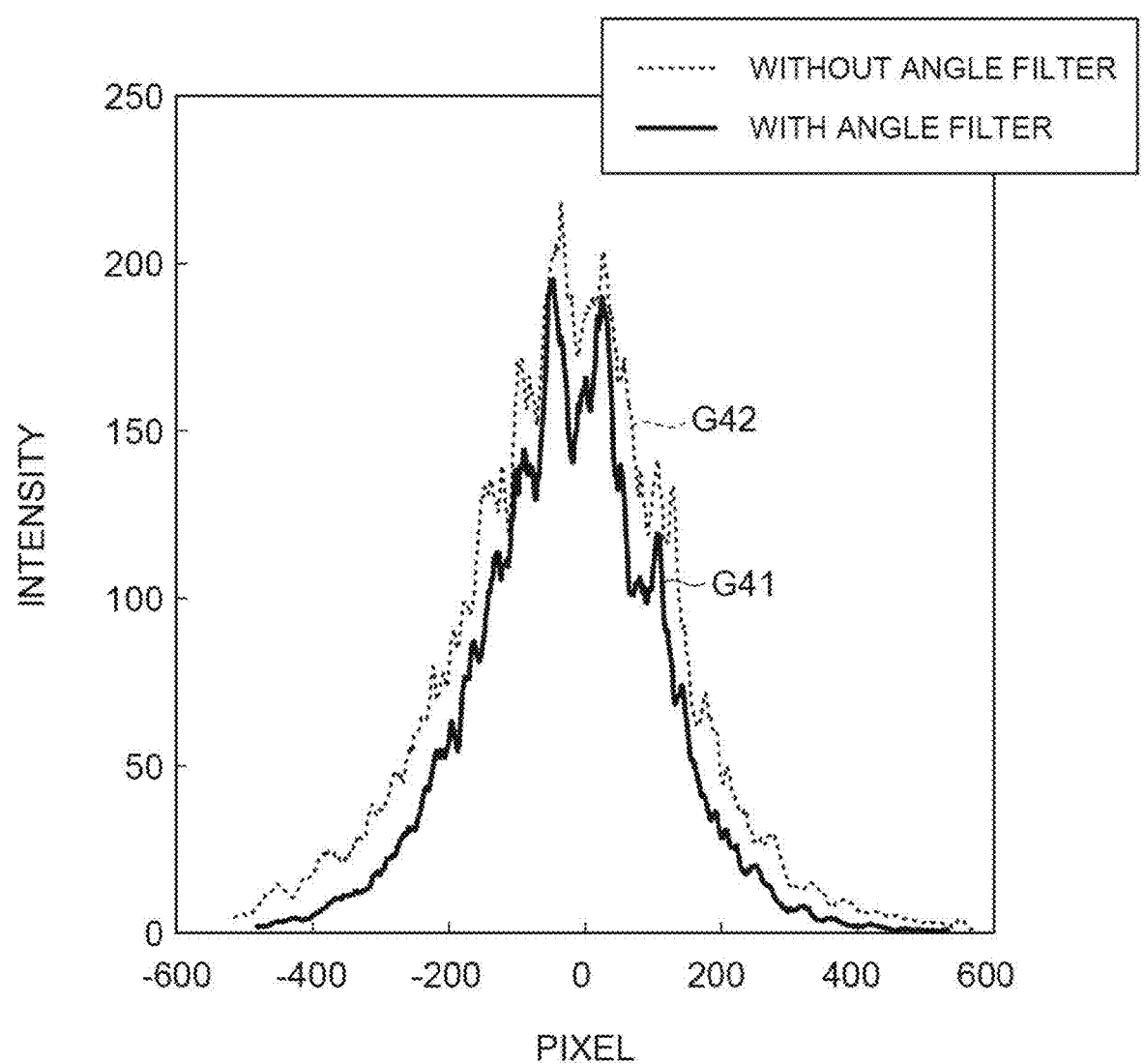
FIG. 19 is a graph showing a beam profile obtained from the data shown in FIG. 18.

FIG. 19 is a graph showing beam profiles obtained from the data shown in FIG. 18. The horizontal axis in FIG. 19 indicates a pixel coordinate in a cross-section including the optical axis, and a pixel coordinate of a center of a spot is set as the origin. The vertical axis in FIG. 19 indicates a light intensity (arb. unit). In FIG. 19, a graph G41 shows an example in which the formed angle filter is disposed, and a graph G42 shows a comparative example in which the formed angle filter is not disposed.

Figure 20:
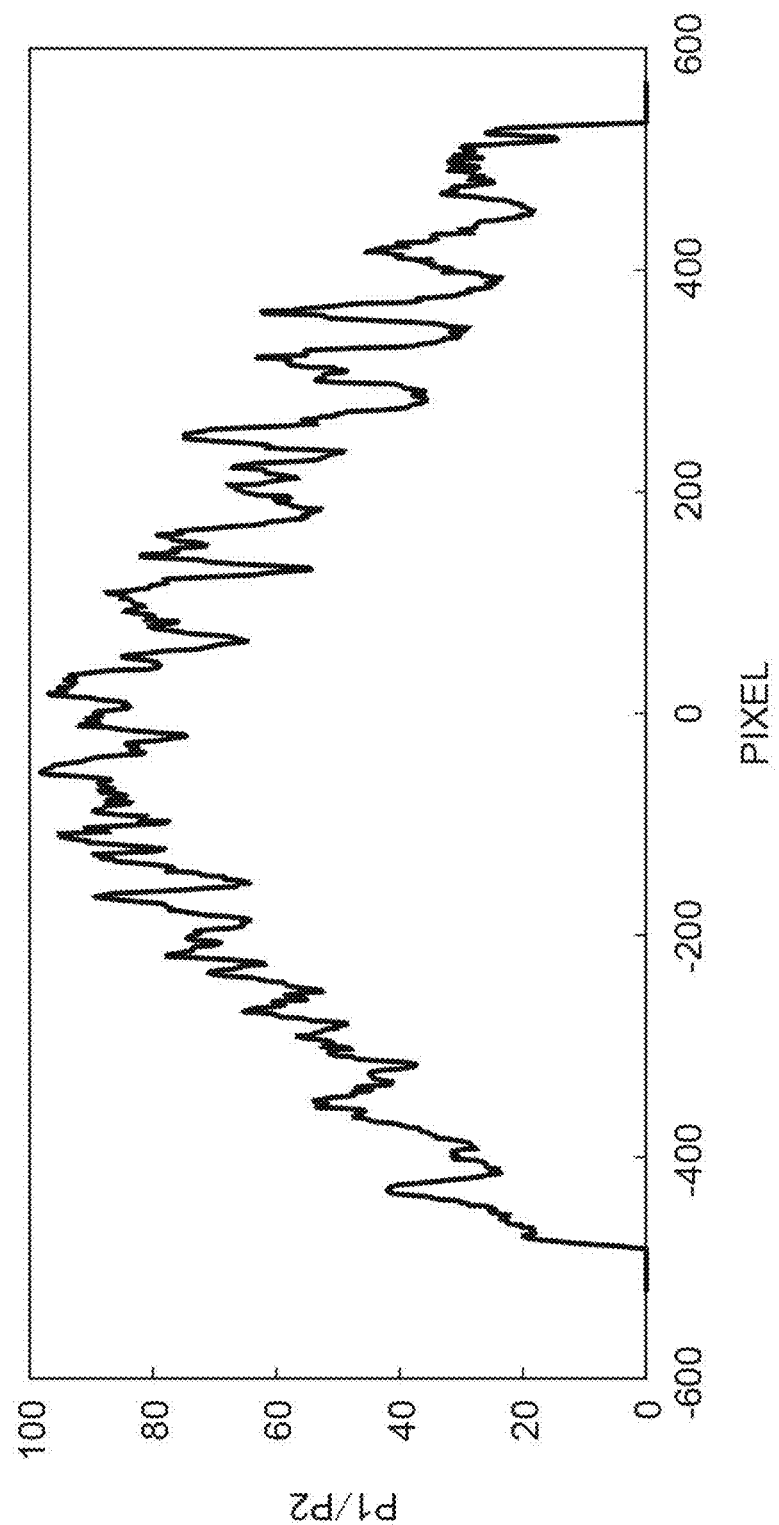
FIG. 20 is a graph showing a ratio of a light intensity when the angle filter is disposed and a light intensity when the angle filter is not disposed.

FIG. 20 is a graph showing a ratio P1/P2 of the light intensity P1 when the angle filter is disposed and the light intensity P2 when the angle filter is not disposed. Referring to FIG. 19 and FIG. 20, as the absolute value of the pixel value increases (in other words, as the distance from the optical axis increases), the incident angle gradually increases, and thus the transmittance decreases.

Figure 21:
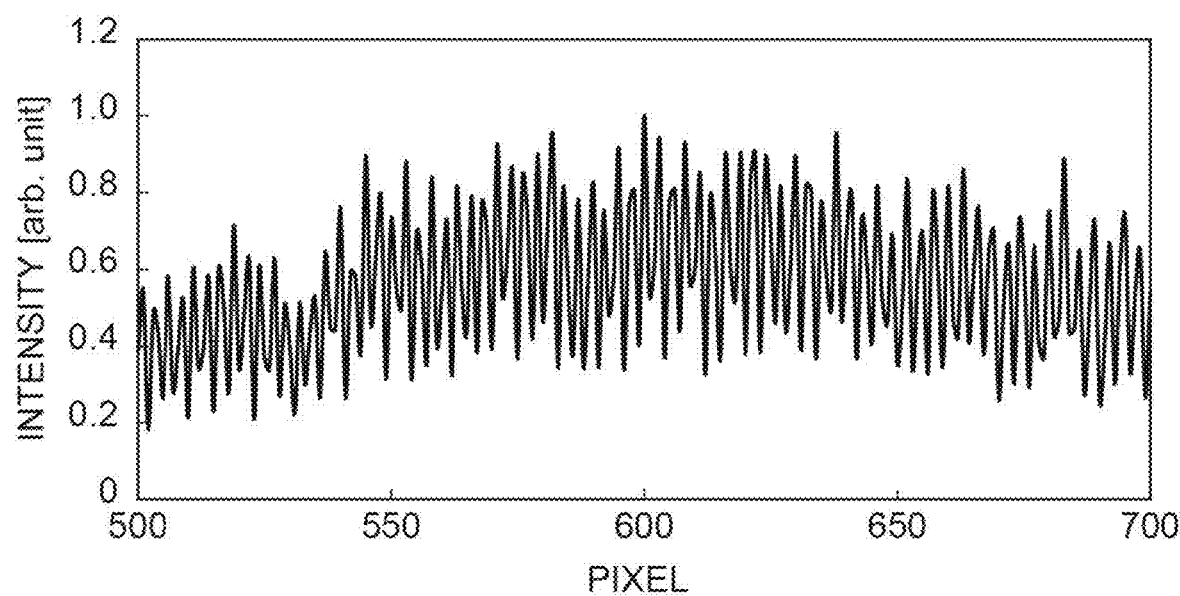
FIG. 21 includes (a) a graph showing a profile of interference fringes when the angle filter is disposed, and (b) a graph showing a profile of interference fringes when the angle filter is not disposed.
Figure 21:
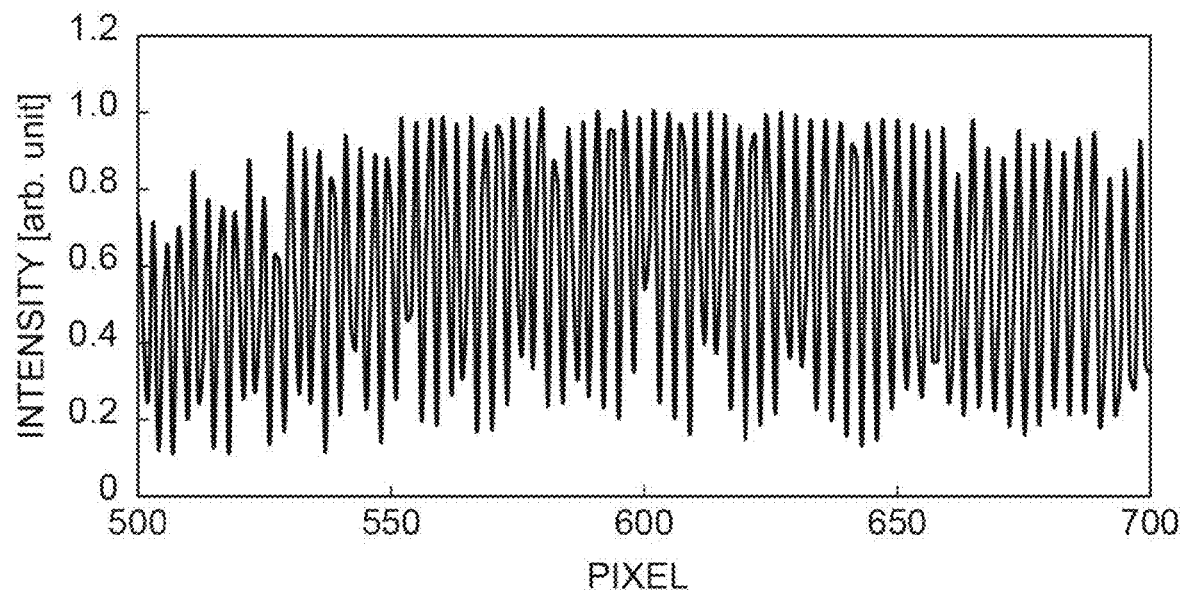

(a) in FIG. 21 shows a profile of interference fringes when the angle filter is disposed, and (b) in FIG. 21 shows a profile of interference fringes when the angle filter is not disposed. When (a) and (b) in FIG. 21 are compared with each other, it can be confirmed that the spatial frequency component is adjusted by arranging the angle filter, and the contrast is improved.

The optical apparatus is not limited to the embodiments and configuration examples described above, and various other modifications are possible. For example, in the above embodiment, the optical apparatus is applied to the spatial frequency filter, and further, the optical apparatus of the above configuration can be used for various applications other than the spatial frequency filter, for example, a spatial filter for mode cleaning of laser light.

Figure 22:
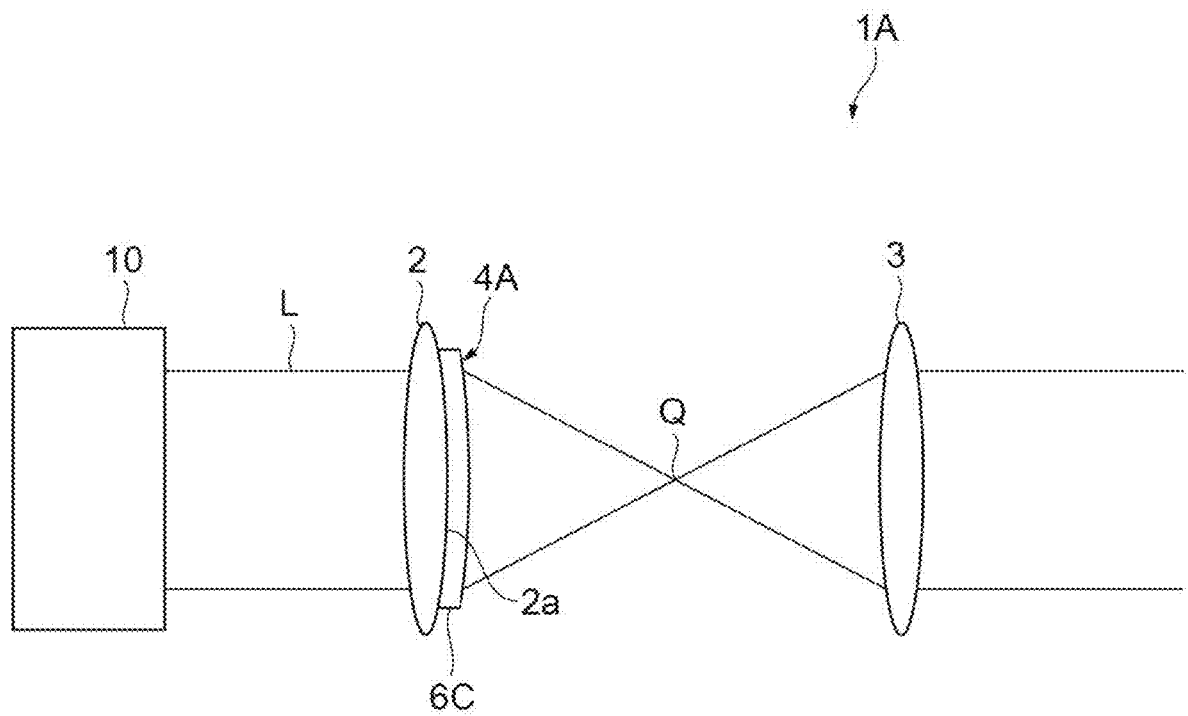
FIG. 22 is a diagram schematically illustrating a configuration of an optical apparatus according to another embodiment.

Further, as in an optical apparatus 1A illustrated in FIG. 22, a dielectric multilayer film 6C constituting an angle filter 4A may be disposed on a light output surface 2a of the focusing optical element 2. Even in this case, the angle filter 4A is disposed on the optical path in the middle of focusing by the focusing optical element 2. The dielectric multilayer film 6C is, for example, any one of the dielectric multilayer films 6A and 6B described above.

Specifically, the dielectric multilayer film 6C of the angle filter 4A may be formed by film deposition on the light output surface 2a of the focusing optical element 2. In this case, since the light output surface 2a has a curvature, the light L may be output in a direction perpendicular to the light output surface 2a at the center portion of the focusing optical element 2, but the light L may be output in a direction inclined with respect to the light output surface 2a at the end portion of the focusing optical element 2. According to the above configuration, the optical system becomes compact, and optical axis adjustment between the focusing optical element 2 and the angle filter 4A or the like becomes unnecessary.

Figure 23:
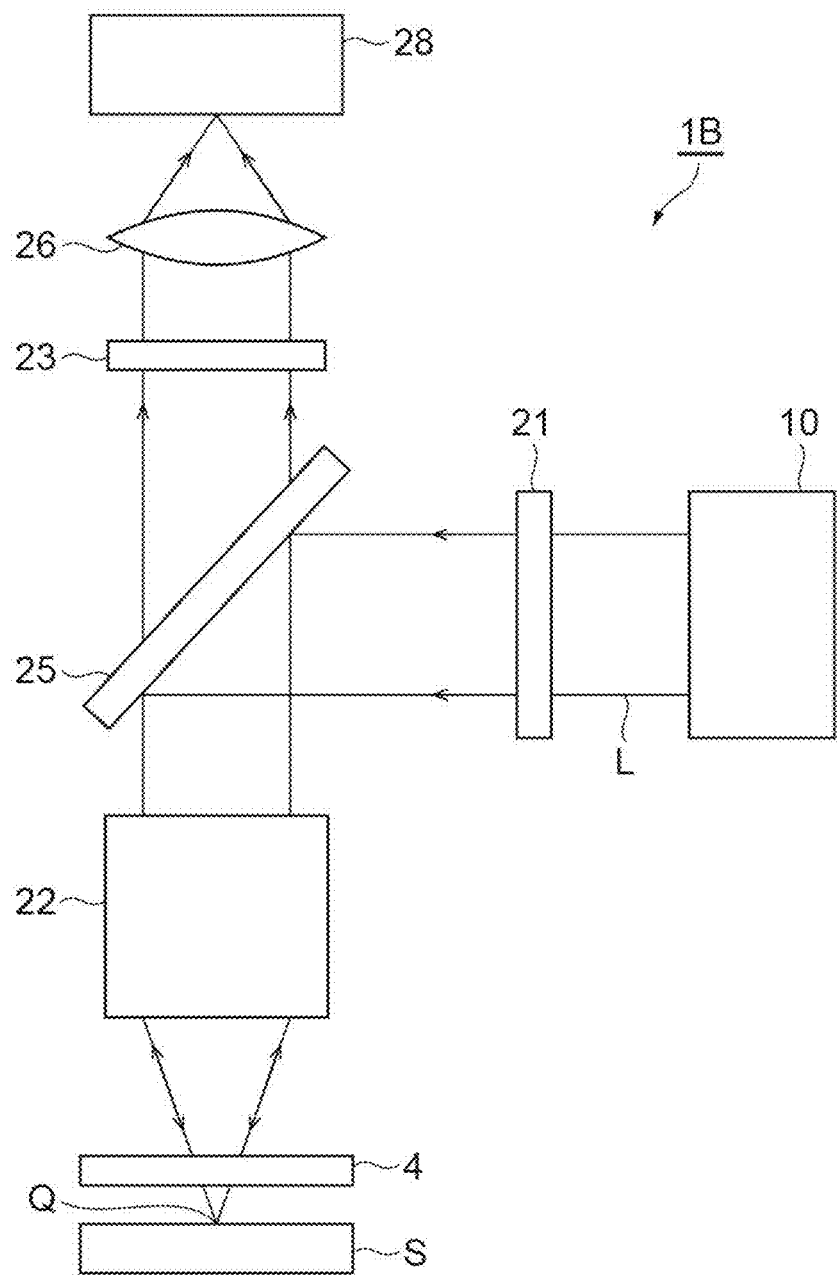
FIG. 23 is a diagram schematically illustrating a configuration of an optical apparatus according to still another embodiment.

The embodiments of the present invention will be further described. FIG. 23 is a diagram schematically illustrating a configuration of an optical apparatus 1B according to still another embodiment. The optical apparatus 1B includes the light source 10, a polarizer (first polarizer) 21, a half mirror 25, an objective lens 22, the angle filter 4, a polarizer (second polarizer) 23, a tube lens 26, and a camera 28, and is configured as a polarization microscope of a reflection type.

The light source 10 outputs light L of a wavelength λ, as parallel light. The polarizer 21 is optically coupled to the light source 10, inputs the light output from the light source 10, and outputs light having a predetermined polarization plane. The polarization plane of the polarizer 21 is set, for example, at an inclination angle of 45° with respect to a polarization direction of the light source.

The polarizer 21 preferably has a crossed Nicol or open Nicol relationship with the polarizer 23 to be described later. Further, it is preferable that the light output from the polarizer 21 has the same intensity of a p-polarized component and a s-polarized component as circular polarization by being transmitted through the polarizer 21.

The light output from the polarizer 21 is reflected to a predetermined optical path toward a sample S by the half mirror 25. The light reflected by the half mirror 25 is focused by the objective lens 22 functioning as the focusing optical element, and is applied to the sample S being an observation target by the optical apparatus 1B. The converging point Q (see FIG. 1) by the objective lens 22 is set on a surface of the sample S or at a predetermined position in the sample S.

Further, between the objective lens 22 and the sample S, the angle filter 4 is provided on the optical path in the middle of focusing of the light by the objective lens 22. The angle filter 4 includes, for example, as illustrated in FIG. 2, the substrate 5, the dielectric multilayer film 6 provided on the principal surface of the substrate 5 on the objective lens 22 side, and the anti-reflection film 7 provided on the principal surface of the substrate 5 on the sample S side.

The dielectric multilayer film 6 of the angle filter 4 includes, for example, as in the dielectric multilayer film 6B illustrated in FIG. 4, the dielectric layers 62 being the low refractive index layers disposed at both of the one end on the substrate 5 side and the other end on the side opposite to the substrate 5. In this case, as shown in (b) in FIG. 12, in the region where the incident angle of light is relatively small, the transmittance of the dielectric multilayer film asymptotically approaches 0%, and almost all of the light is reflected. Further, regarding a difference in transmitting angle property due to the polarization direction in the angle filter 4, it is preferable to determine necessary specifications in a configuration stage of the optical system, and determine the transmitting angle property in each of the p-polarized light and the s-polarized light.

Figure 24:
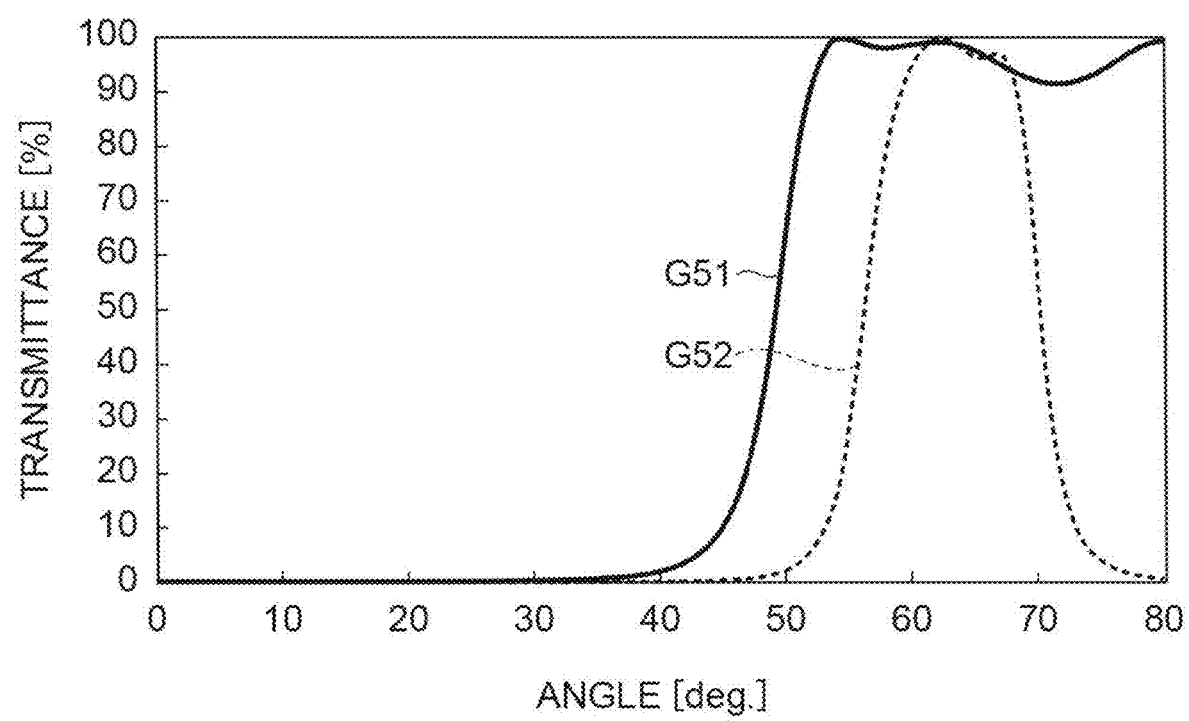
FIG. 24 is a graph showing an example of an incident angle-transmission property of an angle filter.

FIG. 24 is a graph showing an example of an incident angle-transmission property of the angle filter 4 having the above configuration. In this example, the design center wavelength is set to 681 nm, the high refractive index layer of the dielectric multilayer film is constituted by $Ta_2O_5$, and the low refractive index layer is constituted by $SiO_2$. Further, in FIG. 24, a graph G51 shows the incident angle-transmission property for the p-polarized light, and a graph G52 shows the incident angle-transmission property for the s-polarized light.

As shown in FIG. 24, in the graph G51 for the p-polarized light, at the wavelength of 681 nm, the transmittance is about 0% from 0° to 40°, the transmittance gradually increases from 40° to 55°, and the transmittance becomes about 100% at the angle larger than 55°. Further, in the graph G52 for the s-polarized light, at the wavelength of 681 nm, the transmittance is about 0% from 0° to 50°, the transmittance gradually increases from 50° to 62°, and the transmittance becomes about 100% at the angle larger than 62°.

The light transmitted through the angle filter 4 reaches the sample S, and a part thereof is reflected by the sample S. The light reflected from the sample S reaches the half mirror 25 through the angle filter 4 and the objective lens 22. Further, as shown in the graph of FIG. 24, the light having the small incident angle on the angle filter 4 does not reach the sample S and is reflected by the angle filter 4. The light reflected by the angle filter 4 also reaches the half mirror 25 through the objective lens 22. The half mirror 25 transmits the reflected light from the sample S and the reflected light from the angle filter 4, and outputs the light to the polarizer 23.

The polarizer 23 is optically coupled to the half mirror 25. An inclination angle of a polarization plane of the polarizer 23 can be switched, for example, between 45° and 135°. The light output from the polarizer 23 forms an image on an imaging plane of the camera 28 by the tube lens 26, and an optical image resulting from a polarization interference is captured by the camera 28.

In the above configuration, assuming that a phase difference between the p-polarized light and the s-polarized light is Δ, an intensity of the light before input to the angle filter 4 and the sample S is A, an intensity of the light after output from the angle filter 4 and the sample S is I, an intensity of the s-polarized component in the intensity I of the light is Is, an intensity of the p-polarized component in the intensity I of the light is Ip, and a phase is θ, the following Formula holds.

$$I = Is + |Ip|$$

When it is assumed that the reflection of the s-polarized light is large in terms of the spectral property, |Is|>|Ip|, and when a maximum value of the intensity I is set to Imax, and a minimum value of the intensity I is set to Imin, the following Formulas hold.

$$I\max = Is + Ip$$

$$I\min = Is - Ip$$

In addition, when an intensity processed like a trigonometric function from −1 to 1 is represented by I', the following Formula holds.

$I'=2(I-I\text{min})/(I\text{max}-I\text{min})-1$

Thus, by the following Formulas, $\sin(\theta)=I'$ $\theta=\arcsin(I')$ the intensity information in the optical image can be converted into the phase information.

As an operation example of the optical apparatus 1B, for example, the polarizer 21 is adjusted in order to make linearly polarized light of the p-polarized light or the s-polarized light output from the light source 10 into circular polarized light. Further, the polarizer 21 and the polarizer 23 are adjusted to be in the crossed Nicol state. In the angle filter 4 having the property shown in FIG. 24, when the incident angle of light is set to 50°, only the p-polarized component is transmitted through the angle filter 4.

In this case, when a phase change occurs in the sample S, an intensity of the p-polarized component changes by an amount according to the phase change in the light transmitted through the polarizer 23. In this case, an intensity ratio between the p-polarized component and the s-polarized component changes, and thus, the above optical apparatus 1B functions as a polarization microscope by monitoring the light intensity.

According to the optical apparatus 1B of the above configuration, it is possible to perform observation of the sample S in which the polarization interference and the spatial frequency control are combined, by applying the angle filter 4 in the configuration of the polarization microscope. Further, an observation target in a general polarization microscope is a sample having polarization axis dependency. On the other hand, according to the polarization microscope of the configuration to which the angle filter 4 is applied as described above, even when an isotropic medium having no polarization dependency is used as a sample, it is possible to perform the observation of the sample.

Specifically, according to the above configuration, the reflected light from the angle filter 4 (the s-polarized light in the above configuration example) and the reflected light from the sample S (the p-polarized light) are superimposed on each other, thereby enabling the polarization interference by the polarizer 23. Further, accordingly, as described above, even an isotropic medium can be observed by the polarization microscope.

Further, the light transmitted through the angle filter 4 has different intensities in the central region and the peripheral region of the light. For example, it is possible to increase the light intensity in the peripheral region of the focused beam, by performing spatial control of irradiation light on the sample S using the angle filter of the highpass filter type as described above. By irradiating the sample S with the above light, the high frequency component in the sample S can be extracted, and, for example, observation of the sample S for the purpose of edge extraction such as a differential filter can be performed.

Further, according to the above configuration, a polarization component of the light with which the sample S is irradiated can be selected by controlling the polarization using the angle filter 4. For example, when an angle at which the p-polarized component is transmitted and the s-polarized component is reflected is selected as described above, the spatial frequency can be controlled only for the p-polarized component, and the s-polarized component can be extracted without receiving the spatial frequency control.

For the above configuration, for example, a configuration in which only one polarized light is applied to the sample S by applying a polarization beam splitter may be considered. However, in the above configuration, when performing the polarization interference, it is necessary to perform combining by a mirror or the like, the optical system becomes large, and it is difficult to adjust the optical system and secure stability. On the other hand, in the configuration using the angle filter 4 as described above, polarization observation excellent in stability can be realized by a simple configuration.

Figure 25:
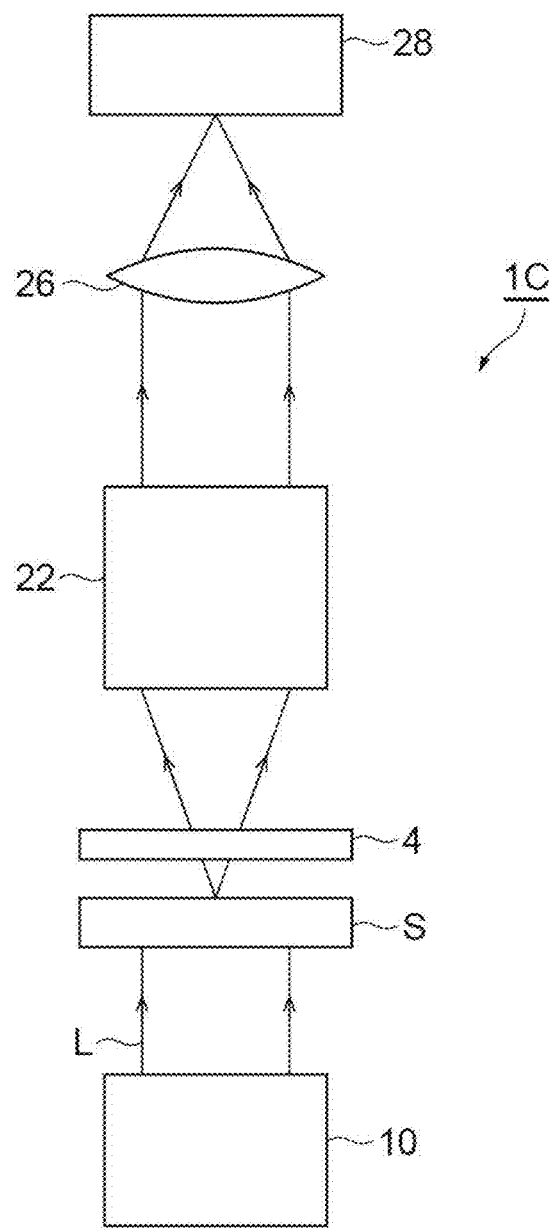
FIG. 25 is a diagram illustrating an example of a configuration of an optical apparatus using an angle filter.

The angle filter 4 according to the above embodiment is not limited to the configuration examples described above, and can be applied to, for example, an optical apparatus 1C as illustrated in a configuration example of FIG. 25. The optical apparatus 1C includes the light source 10, the angle filter 4, the objective lens 22, the tube lens 26, and the camera 28.

The light L output from the light source 10 as parallel light is applied to the sample S, and a part thereof is transmitted through the sample S. The light transmitted through the sample S is input to the angle filter 4 provided between the sample S and the objective lens 22. The angle filter 4 has, for example, the same configuration and property as those of the angle filter 4 in the optical apparatus 1B illustrated in FIG. 23. The light transmitted through the angle filter 4 forms an image on the imaging plane of the camera 28 by the objective lens 22 and the tube lens 26, and an optical image is captured by the camera 28.

In the above configuration, the output light transmitted through the sample S is affected by diffraction, scattering, and the like in the sample S, and is output as light having a divergence angle compared to the input parallel light. For the above output light from the sample S, when the angle filter of the highpass filter type as described above is applied as the angle filter 4, a parallel light component having a small angle is blocked, and light having a divergence angle of a certain degree or more (for example, light having the angle of 45° or more) passes through the angle filter 4 and is imaged by the camera 28.

Figure 26:
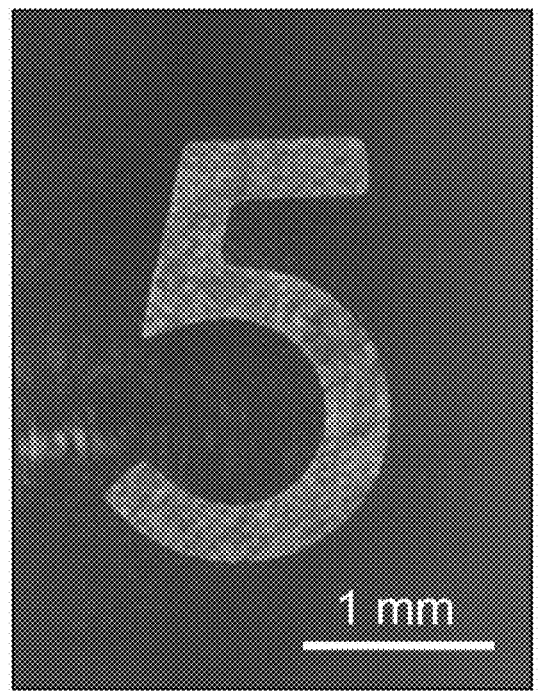
FIG. 26 includes (a), (b) diagrams showing examples of an image of a sample acquired by a camera.
Figure 26:

(a) and (b) in FIG. 26 show examples of the image of the sample S acquired by the camera 28. (a) in FIG. 26 shows an image acquired when the angle filter 4 is not provided, and (b) in FIG. 26 shows an image acquired when the angle filter 4 is applied. In addition, in (b) in FIG. 26, since the light intensity decreases due to arrangement of the angle filter, luminance of the original image is increased three times.

As described above, by disposing the angle filter 4 between the sample S and the objective lens 22 and extracting the high frequency component, it is possible to acquire the image of the sample S in which the edge is emphasized. Further, in the image with the angle filter shown in (b) in FIG. 26, compared to the image without the angle filter, it is possible to confirm, for example, an image of small dust or dirt in an image of a character "5".

The optical apparatus of the above embodiment includes an angle filter disposed on an optical path in the middle of focusing or in the middle of divergence by a focusing optical element, and the angle filter includes a dielectric multilayer film in which dielectric layers (first dielectric layers) having a first refractive index and dielectric layers (second dielectric layers) having a second refractive index lower than the first refractive index are alternately stacked.

In the above optical apparatus, a distribution of a transmittance or a reflectance of the dielectric multilayer film with respect to an incident angle on the dielectric multilayer film at a wavelength of light propagating through the optical path may include a region in which the transmittance or the reflectance monotonically increases or monotonically decreases with respect to the incident angle, and an absolute value of a change rate of the transmittance or the reflectance with respect to the incident angle in the region may be 20% or less per unit angle (1°).

In this case, in the above region, the transmittance or the reflectance gently changes with respect to the incident angle. Therefore, the optical apparatus described above can be used as, for example, an apodization filter or an anti-apodization filter (super resolution filter).

In the above optical apparatus, the angle filter may further include a substrate having a light transmitting property at a wavelength of light propagating through the optical path, and the substrate may include a first principal surface on which the dielectric multilayer film is provided and a second principal surface opposite to the first principal surface and on which an anti-reflection film is provided.

As described above, the angle filter further includes the substrate having the light transmitting property, and thus, the dielectric multilayer film can be suitably formed. Further, when light reflected on the second principal surface is reflected again on the first principal surface, the light is superimposed on the output light, and affects the filter property. By providing the anti-reflection film on the second principal surface opposite to the first principal surface on which the dielectric multilayer film is provided out of the two principal surfaces of the substrate, it is possible to reduce the reflection on the second principal surface, and suppress the influence on the filter property caused by the reflection.

In the above optical apparatus, the angle filter may further include a substrate having a light transmitting property at a wavelength of light propagating through the optical path, and the first refractive index may be higher than a refractive index of the substrate, and the second refractive index may be lower than the refractive index of the substrate, and a dielectric layer located at one end on a substrate side in a stacking direction of the dielectric multilayer film may have the first refractive index.

As described above, the angle filter further includes the substrate having the light transmitting property, and thus, the dielectric multilayer film can be suitably formed. Further, in this case, the dielectric multilayer film functions as a low-pass filter, transmits light having the incident angle smaller than a certain incident angle, and reflects the other light. Therefore, in the light passing through the focusing optical system, light included in a central region including an optical axis of the focusing optical system is transmitted, and light included in a peripheral region surrounding the central region is reflected.

In general, a frequency of the light included in the central region is low, and a frequency of the light included in the peripheral region is high. Thus, the dielectric multilayer film transmits a low frequency component and reflects a high frequency component. Therefore, when the angle filter is used as a transmission type filter, the optical apparatus can be used as a frequency filter which selectively extracts only the low frequency component. Further, when the angle filter is used as a reflection type filter, the optical apparatus can be used as a frequency filter which selectively extracts only the high frequency component.

In the above optical apparatus, the angle filter may further include a substrate having a light transmitting property at a wavelength of light propagating through the optical path, and the first refractive index may be higher than a refractive index of the substrate, and the second refractive index may be lower than the refractive index of the substrate, and a dielectric layer located at one end on a substrate side in a stacking direction of the dielectric multilayer film may have the second refractive index.

As described above, the angle filter further includes the substrate having the light transmitting property, and thus, the dielectric multilayer film can be suitably formed. Further, in this case, the dielectric multilayer film functions as a high-pass filter, reflects light having the incident angle smaller than a certain incident angle, and transmits the other light. Therefore, in the light passing through the focusing optical system, light included in a central region including an optical axis of the focusing optical system is reflected, and light included in a peripheral region surrounding the central region is transmitted.

Thus, the dielectric multilayer film reflects a low frequency component and transmits a high frequency component. Therefore, when the angle filter is used as a transmission type filter, the optical apparatus can be used as a frequency filter which selectively extracts only the high frequency component. Further, when the angle filter is used as a reflection type filter, the optical apparatus can be used as a frequency filter which selectively extracts only the low frequency component.

The above optical apparatus may further include another focusing optical element disposed at a subsequent stage of the focusing optical element and constituting a 4f optical system together with the focusing optical element, and the angle filter may be disposed on an optical path between the focusing optical element and the other focusing optical element. In this case, a frequency filter of a transmission type which outputs parallel light including only a desired frequency component can be obtained.

In the above optical apparatus, the angle filter may be disposed on a light output surface of the focusing optical element. In this case, the optical system becomes compact, and further, optical axis adjustment and the like between the focusing optical element and the angle filter becomes unnecessary.

INDUSTRIAL APPLICABILITY

The embodiments can be used as an optical apparatus capable of suppressing a change in frequency property caused by a change in relative position between a focusing optical system and a filter.

REFERENCE SIGNS LIST 1, 1A—optical apparatus, 2, 3—focusing optical element, 4, 4A—angle filter, 5—substrate, 6, 6A, 6B, 6C—dielectric multilayer film, 6a—one end, 6b—other end, 7—anti-reflection film, 10—light source, 51—first principal surface, 52—second principal surface, 61, 62—dielectric layer, 100—optical apparatus, 101, 101A, 101B—spatial filter, 102—aperture, 103—shielding portion, AX—optical axis, B1—central region, B2—peripheral region, L—light, Q—converging point, 1B, 1C—optical apparatus, 21—polarizer, 22—objective lens, 23—polarizer, 25—half mirror, 26—tube lens, 28—camera, S—sample.

The invention claimed is:

1. An optical apparatus comprising:
an angle filter disposed on an optical path in the middle of focusing or divergence by a focusing optical element, wherein
the angle filter includes a dielectric multilayer film in which dielectric layers having a first refractive index and dielectric layers having a second refractive index lower than the first refractive index are alternately stacked.

2. The optical apparatus according to claim 1, wherein a distribution of a transmittance or a reflectance of the dielectric multilayer film with respect to an incident angle on the dielectric multilayer film at a wavelength of light propagating through the optical path includes a region in which the transmittance or the reflectance monotonically increases or monotonically decreases with respect to the incident angle, and an absolute value of a change rate of the transmittance or the reflectance with respect to the incident angle in the region is 20% or less per unit angle.

3. The optical apparatus according to claim 1, wherein the angle filter further includes a substrate having a light transmitting property at a wavelength of light propagating through the optical path, and wherein the substrate includes a first principal surface on which the dielectric multilayer film is provided and a second principal surface opposite to the first principal surface and on which an anti-reflection film is provided.

4. The optical apparatus according to claim 1, wherein the angle filter further includes a substrate having a light transmitting property at a wavelength of light propagating through the optical path, and wherein the first refractive index is higher than a refractive index of the substrate, and the second refractive index is lower than the refractive index of the substrate, and a dielectric layer located at one end on a substrate side in a stacking direction of the dielectric multilayer film has the first refractive index.

5. The optical apparatus according to claim 1, wherein the angle filter further includes a substrate having a light transmitting property at a wavelength of light propagating through the optical path, and wherein the first refractive index is higher than a refractive index of the substrate, and the second refractive index is lower than the refractive index of the substrate, and a dielectric layer located at one end on a substrate side in a stacking direction of the dielectric multilayer film has the second refractive index.

6. The optical apparatus according to claim 1, further comprising another focusing optical element disposed at a subsequent stage of the focusing optical element and constituting a 4f optical system together with the focusing optical element, wherein the angle filter is disposed on an optical path between the focusing optical element and the other focusing optical element.

7. The optical apparatus according to claim 1, wherein the angle filter is disposed on a light output surface of the focusing optical element.

* * * * *